United States Patent
Nakamura

(10) Patent No.: US 10,936,393 B2
(45) Date of Patent: Mar. 2, 2021

(54) TRANSMISSION AND RECEPTION SYSTEM, DATA RECEPTION APPARATUS, AND DATA RECEPTION METHOD USING PLURAL TRANSMISION PATHS

(71) Applicant: FUJITSU LIMITED, Kawasaki (JP)

(72) Inventor: Yosuke Nakamura, kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 16/268,025

(22) Filed: Feb. 5, 2019

(65) Prior Publication Data

US 2019/0303227 A1 Oct. 3, 2019

(30) Foreign Application Priority Data

Mar. 27, 2018 (JP) .............................. JP2018-060628

(51) Int. Cl.
*G06F 11/07* (2006.01)
*G06F 13/42* (2006.01)

(52) U.S. Cl.
CPC ........ *G06F 11/076* (2013.01); *G06F 11/0745* (2013.01); *G06F 13/4282* (2013.01); *G06F 2213/0008* (2013.01)

(58) Field of Classification Search
CPC ............... G06F 11/076; G06F 11/0745; G06F 13/4282; G06F 2213/0008
See application file for complete search history.

(56) References Cited

U.S. PATENT DOCUMENTS

| | | | |
|---|---|---|---|
| 5,485,453 A | 1/1996 | Wahlman et al. | |
| 7,409,594 B2 * | 8/2008 | Mukherjee | G06F 11/0724 714/26 |
| 7,836,352 B2 * | 11/2010 | Sharma | H04L 1/203 714/44 |
| 8,689,091 B2 * | 4/2014 | Uchida | H04L 49/555 714/799 |
| 2011/0182384 A1 * | 7/2011 | Iwatsuki | H04L 25/14 375/316 |

(Continued)

FOREIGN PATENT DOCUMENTS

JP 8-510870 11/1996
JP 2004-260368 9/2004

(Continued)

*Primary Examiner* — Matthew M Kim
*Assistant Examiner* — Indranil Chowdhury
(74) *Attorney, Agent, or Firm* — Staas & Halsey LLP

(57) ABSTRACT

A data reception apparatus connected to a data transmission apparatus via transmission paths includes: error detection circuits that are each provided for each of the transmission paths and that each detect an error in received data that has been received from the data transmission apparatus; storage circuits that are each provided for each of the transmission paths and that each store the received data and read the received data at a reported read position at a reported read timing; a selection circuit that selects one of the transmission paths according to error detection results provided by the error detection circuits; and a report circuit that compares received data stored by a storage circuit corresponding to a selected transmission path with received data stored by each of other storage circuits and, according to a comparison result, reports the read timing and the read position to each of the storage circuits.

12 Claims, 14 Drawing Sheets

(56) References Cited

U.S. PATENT DOCUMENTS

| | | | | |
|---|---|---|---|---|
| 2014/0325107 A1* | 10/2014 | Iwatsuki | ............ | G06F 13/4022 710/124 |
| 2014/0372791 A1* | 12/2014 | Adachi | ............... | G06F 13/1689 714/5.1 |
| 2018/0107625 A1* | 4/2018 | Hwang | ............... | G06F 13/4282 |

FOREIGN PATENT DOCUMENTS

| | | |
|---|---|---|
| JP | 2015-228541 | 12/2015 |
| WO | WO 94/18769 | 8/1994 |

\* cited by examiner

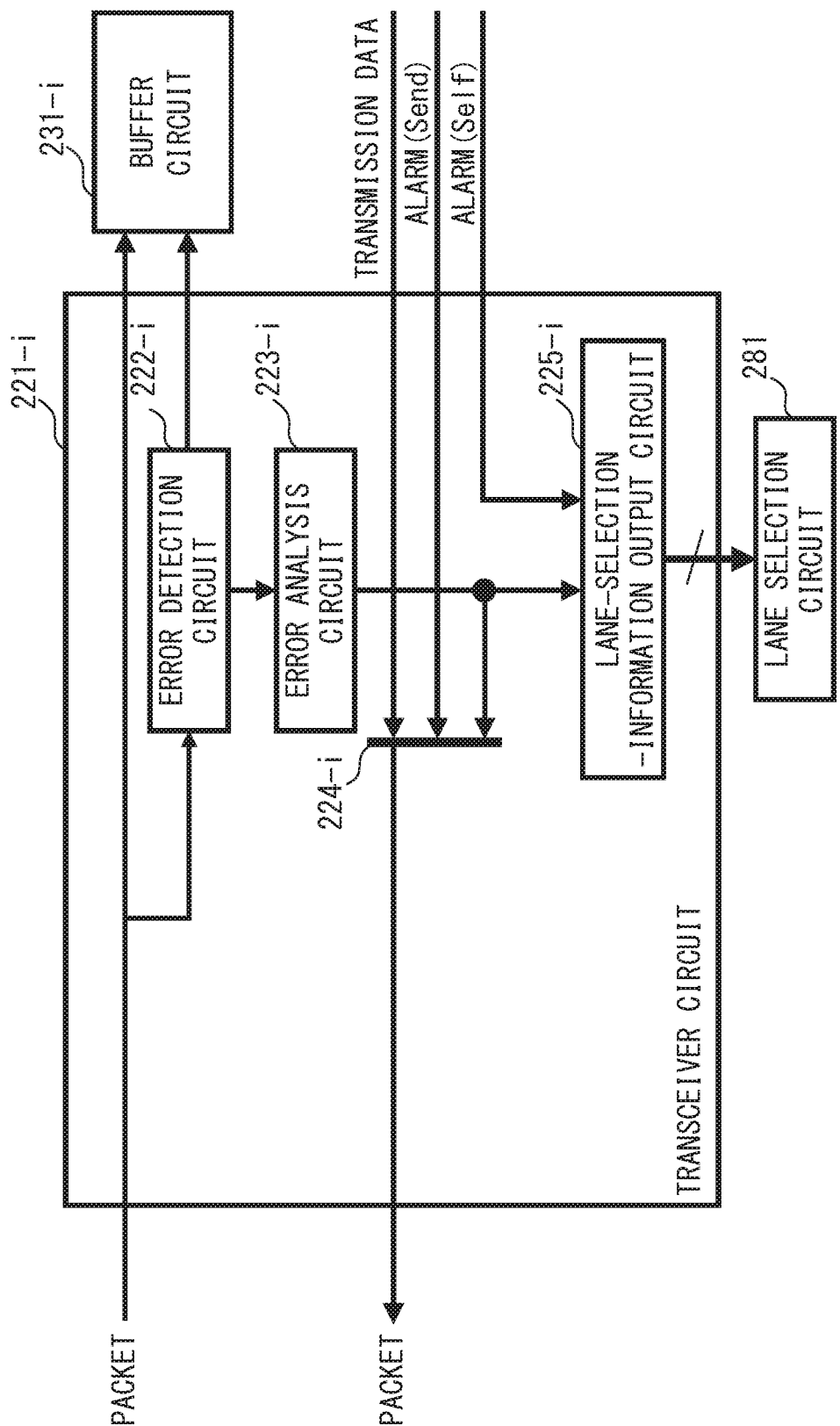
F I G. 4

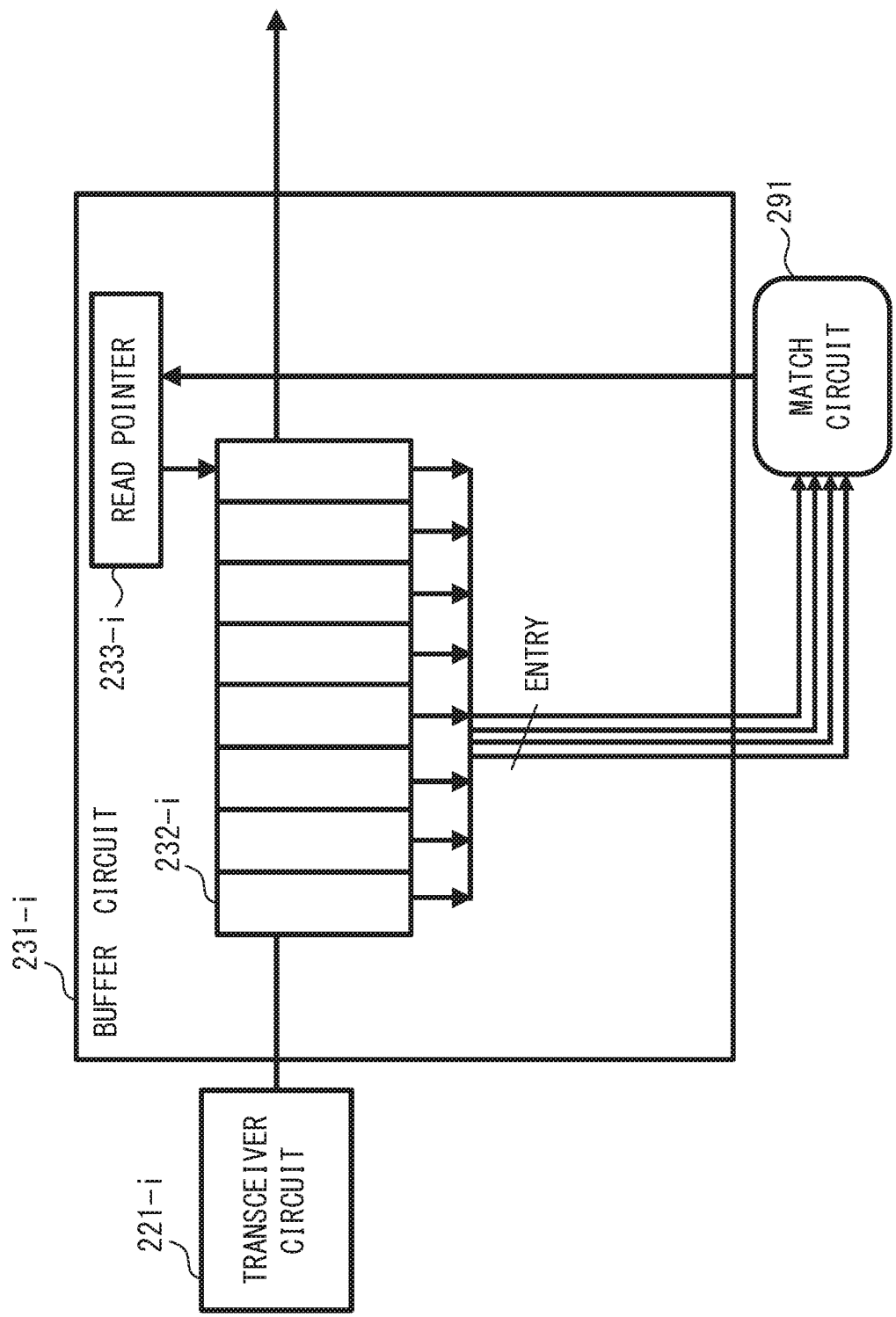
F I G. 5

| TIME | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ |
|---|---|---|---|---|---|---|---|---|---|---|---|---|---|---|
| IN(L0) | – | $H_1$ | $D_1$ | $D_5$ | $E_1$ | $H_5$ | $D_9$ | $E_5$ | – | $H_9$ | $D_{13}$ | $D_{17}$ | $E_9$ | – |
| IN(L1) | – | $H_2$ | $D_2$ | $D_6$ | $E_2$ | $H_6$ | $D_{10}$ | $E_6$ | – | $H_{10}$ | $D_{14}$ | $D_{18}$ | $E_{10}$ | – |
| IN(L2) | – | $H_3$ | $D_3$ | $D_7$ | $E_3$ | $H_7$ | $D_{11}$ | $E_7$ | – | – | $D_{10}$ | $H_{11}$ | $D_{19}$ | $E_{11}$ |
| IN(L3) | – | – | $H_4$ | $D_4$ | $D_8$ | $E_4$ | $H_8$ | $D_{12}$ | $E_8$ | – | $H_{12}$ | $H_{16}$ | $D_{20}$ | $E_{12}$ |
| SR L0 | ED | | | | | | | | | | | | | |
| | EA | | | | | | | | | | | | | |
| | LSI | | | | | | | | | | | | | |
| BF L0 | E | | $H_1$ | $D_1$ | $D_5$ | $E_1$ | $H_5$ | $D_9$ | $E_5$ | | $H_9$ | $D_{13}$ | $D_{17}$ | $E_9$ |
| | RD | | | | | $H_1$ | $D_1$ | $D_5$ | $E_1$ | $H_5$ | $D_9$ | $E_5$ | | $H_9$ |
| BF L1 | E | | $H_2$ | $D_2$ | $D_6$ | $E_2$ | $H_6$ | $D_{10}$ | $E_6$ | | $H_{10}$ | $D_{14}$ | $D_{18}$ | $E_{10}$ |
| | RD | | | | | $H_2$ | $D_2$ | $D_6$ | $E_2$ | $H_6$ | $D_{10}$ | $E_6$ | | $H_{10}$ |
| BF L2 | E | | $H_3$ | $D_3$ | $D_7$ | $E_3$ | $H_7$ | $D_{11}$ | $E_7$ | | $H_{11}$ | $D_{15}$ | $D_{19}$ | |
| | RD | | | | | $H_3$ | $D_3$ | $D_7$ | $E_3$ | $H_7$ | $D_{11}$ | $E_7$ | | $H_{11}$ |
| BF L3 | E | | | $H_4$ | $D_4$ | $D_8$ | $E_4$ | $H_8$ | $D_{12}$ | $E_8$ | | $H_{12}$ | $H_{16}$ | $D_{20}$ |
| | RD | | | | | | $H_4$ | $D_4$ | $D_8$ | $E_4$ | $H_8$ | $D_{12}$ | $E_8$ | | $H_{12}$ |
| MC | LS | 0 | | | | | | | | | | | | |
| | CT | | | | | | | | | | | | | |
| OUT(ALL) | | – | – | – | – | – | $H_{1-4}$ | $D_{1-4}$ | $D_{5-8}$ | $E_{1-4}$ | $E_{5-8}$ | $D_{9-12}$ | $E_{5-8}$ | – | $H_{9-12}$ |

FIG. 7

| TIME | | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ |
|---|---|---|---|---|---|---|---|---|---|---|---|---|---|---|---|
| IN(L0) | | – | $H_1$ | $D_1$ | $D_5$ | $E_1$ | $H_5$ | $D_9$ | $E_5$ | – | $H_9$ | $D_{13}$ | $D_{17}$ | $E_9$ | – |
| IN(L1) | | – | $H_3$ | $D_3$ | $D_7$ | $E_3$ | $H_7$ | $D_{11}$ | $E_7$ | – | $H_{10}$ | $D_{11}$ | $D_{19}$ | $E_{11}$ | – |
| IN(L2) | | – | $H_3$ | $D_3$ | $D_7$ | $E_3$ | $H_7$ | $D_{11}$ | $E_7$ | – | – | $H_{10}$ | $H_{11}$ | $D_{19}$ | $E_{11}$ |
| IN(L3) | | – | – | $H_4$ | $D_4$ | $D_8$ | $E_4$ | $H_8$ | $D_{12}$ | $E_8$ | – | $H_{12}$ | $H_{16}$ | $D_{20}$ | $E_{12}$ |
| SR L0 | ED | | | | | | Er | | | | | | | Er | |
| SR L0 | EA | 0 | | | | | | 1 | | | | 0 | | | 1 |
| SR L0 | LSI | | | | | | | | | | | | | | |
| SR L1 | ED | | | | | | | | Er | | | | | | |
| SR L1 | EA | 0 | | | | | | | | 1 | | 0 | | | |
| SR L1 | LSI | | | | | | | | | | | | | | |
| SR L2 | ED | | | | | | Er | | Er | | | | | | |
| SR L2 | EA | 0 | | | | | | 1 | | 2 | | 0 | | | |
| SR L2 | LSI | | | | | | | | | | | | | | |
| SR L3 | ED | | | | | | | | | | | | | | |
| SR L3 | EA | 0 | | | | | | | | | | 0 | | | |
| SR L3 | LSI | | | | | | | | | | | | | | |
| UPDT | | | | | | | | | | 1 | | | | | |
| MC | LS | 0 | | | | | | | | | 3 | | | | |

F I G. 8

| TIME | | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ |
|---|---|---|---|---|---|---|---|---|---|---|---|---|---|---|---|
| IN(L0) | | – | $H_1$ | $D_1$ | $D_5$ | $E_1$ | $H_5$ | $D_9$ | $E_5$ | – | $H_9$ | $D_{13}$ | $D_{17}$ | $E_9$ | – |
| IN(L1) | | – | $H_2$ | $D_2$ | $D_6$ | $E_2$ | $H_6$ | $D_{10}$ | $E_6$ | – | $H_{10}$ | $D_{14}$ | $D_{18}$ | $E_{10}$ | – |
| IN(L2) | | – | $H_3$ | $D_3$ | $D_7$ | $E_3$ | $H_7$ | $D_{11}$ | $E_7$ | – | – | $H_{10}$ | $H_{11}$ | $D_{19}$ | $E_{11}$ |
| IN(L3) | | – | – | $H_4$ | $D_4$ | $D_8$ | $E_4$ | $H_8$ | $D_{12}$ | $E_8$ | – | $H_{12}$ | $H_{16}$ | $D_{20}$ | $E_{12}$ |
| SR L0 | ED | | | | | Er | | | | | | | | Er | |
| | EA | | | | | 0 | | | | 1 | | | 0 | | 1 |
| | LSI | | | | | | | | | | | | | | |
| BF L0 | E | | | $H_1$ | $D_1$ | $D_5$ | $E_1$ | $H_5$ | $D_9$ | $E_5$ | | $H_9$ | $D_{13}$ | $D_{17}$ | $E_9$ |
| | RD | | | | | | $H_1$ | $D_1$ | $D_5$ | $E_1$ | $H_5$ | $D_8$ | $E_5$ | | $H_9$ |
| BF L1 | E | | | $H_2$ | $D_2$ | $D_6$ | $E_2$ | $H_6$ | $D_{10}$ | $E_6$ | | $H_{10}$ | $D_{14}$ | $D_{18}$ | $E_{10}$ |
| | RD | | | | | | $H_2$ | $D_2$ | $D_6$ | $E_2$ | $H_6$ | $D_{10}$ | $E_6$ | | $H_{10}$ |
| BF L2 | E | | | $H_3$ | $D_3$ | $D_7$ | $E_3$ | $H_7$ | $D_{11}$ | $E_7$ | | $H_{11}$ | $D_{15}$ | | $D_{19}$ |
| | RD | | | | | | $H_3$ | $D_3$ | $D_7$ | $E_3$ | $H_7$ | $D_{11}$ | $E_7$ | | $H_{11}$ |
| BF L3 | E | | | | $H_4$ | $D_4$ | $D_8$ | $E_4$ | $H_8$ | $D_{12}$ | $E_8$ | | $H_{12}$ | $H_{16}$ | $D_{20}$ |
| | RD | | | | | | $H_4$ | $D_4$ | $D_8$ | $E_4$ | $H_8$ | $D_{12}$ | $E_8$ | | $H_{12}$ |
| MC | LS | | | | | 0 | | | | | | 3 | | | |
| | CT | | | | | | | | | | | | | | |
| OUT(ALL) | | – | – | – | – | – | $H_{1-4}$ | $D_{1-4}$ | $D_{5-8}$ | $E_{1-4}$ | $E_{5-8}$ | $D_{9-12}$ | $E_{5-8}$ | – | $H_{9-12}$ |

F I G. 9

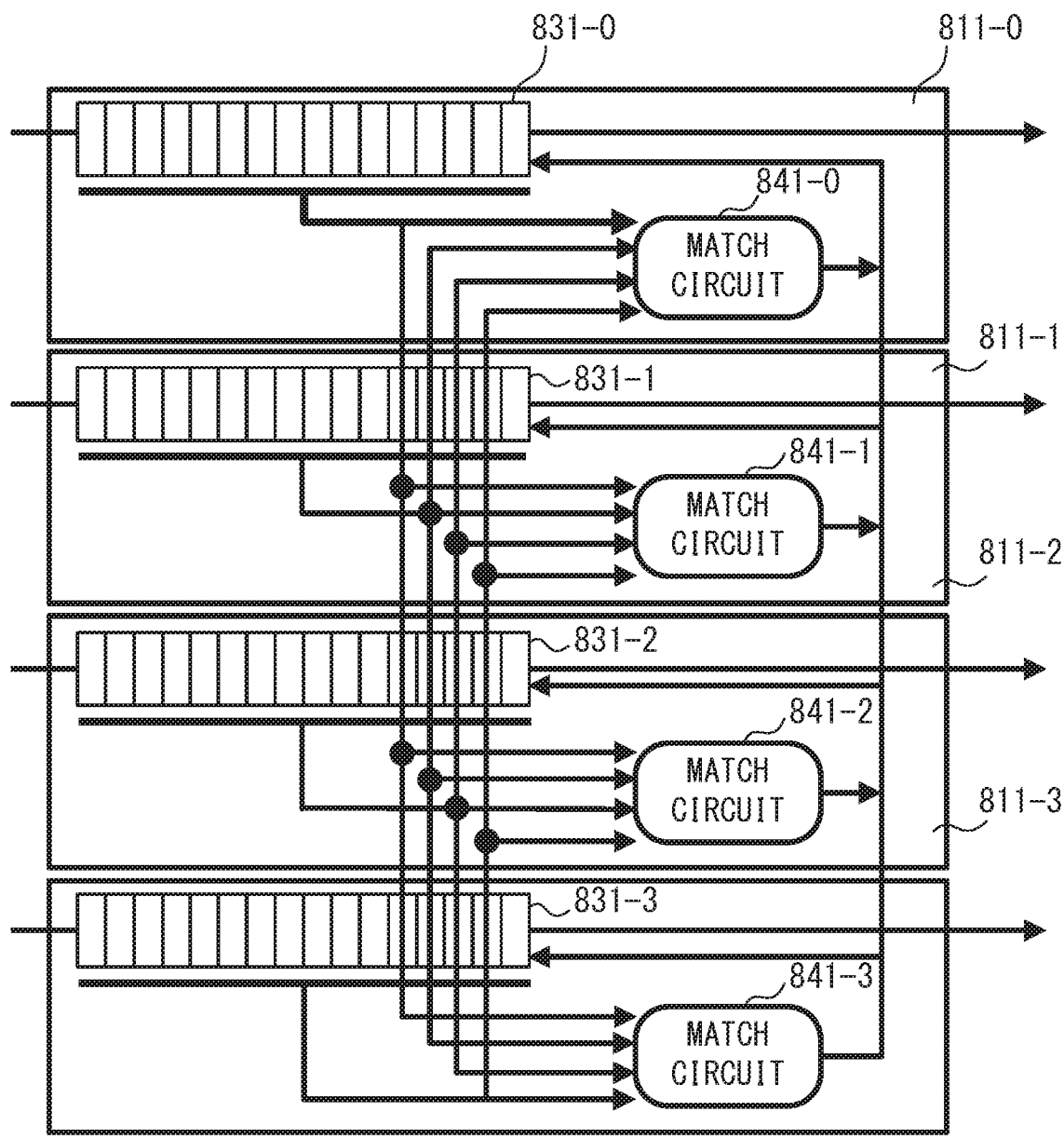
F I G. 12

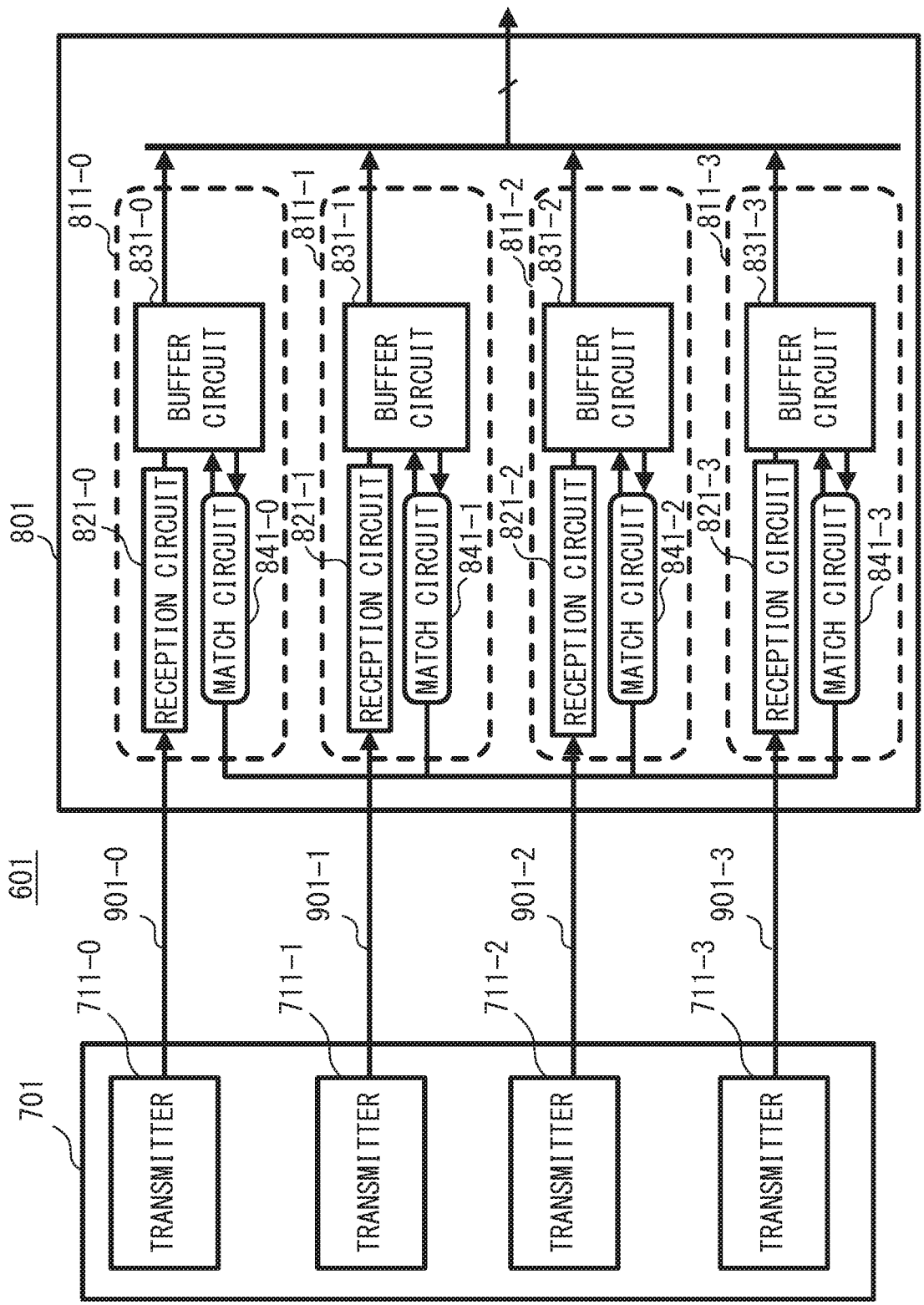

TRANSMISSION AND RECEPTION SYSTEM, DATA RECEPTION APPARATUS, AND DATA RECEPTION METHOD USING PLURAL TRANSMISION PATHS

CROSS-REFERENCE TO RELATED APPLICATION

This application is based upon and claims the benefit of priority of the prior Japanese Patent Application No. 2018-060628, filed on Mar. 27, 2018, the entire contents of which are incorporated herein by reference.

FIELD

The embodiments discussed herein are related to a transmission and reception system, a data reception apparatus, and a data reception method.

BACKGROUND

When a serial communication is performed between a transmission circuit and a reception circuit using a plurality of lanes, the transmission circuit divides data to be transmitted into as many pieces as the number of the lanes and transmits the pieces to the individual lanes. The reception circuit reconstructs the data from the pieces received from the lanes.

A known technique is such that delay differences between frames of a plurality of flows are measured using one circuit (see, for example, patent document 1). A known method is such that data in a data packet switch is forwarded from the output side of the data packet switch (see, for example, patent document 2). A known network transfer apparatus has few wiring regions and enables different redundancy configurations to be achieved (see, for example, patent document 3).

Patent document 1: Japanese Laid-open Patent Publication No. 2015-228541
Patent document 2: Japanese National Publication of International Patent Application No. 8-510870
Patent document 3: Japanese Laid-open Patent Publication No. 2004-260368

SUMMARY

According to an aspect of the embodiments, a transmission and reception system includes a data transmission apparatus and a data reception apparatus connected to the data transmission apparatus via a plurality of transmission paths.

The data reception apparatus includes a plurality of error detection circuits, a plurality of storage circuits, a selection circuit, and a report circuit.

Each of the plurality of error detection circuits is provided for each of the plurality of transmission paths and detects an error in received data that has been received from the data transmission apparatus.

Each of the plurality of storage circuits, which is provided for each of the plurality of transmission paths, stores received data and reads the received data at a reported read position at a reported read timing.

The selection circuit selects one of the plurality of transmission paths according to a plurality of error detection results provided by each of the plurality of error detection circuits.

The report circuit compares received data stored by a storage circuit corresponding to a transmission path selected by the selection circuit with received data stored by each of the other storage circuits. According to a comparison result, the report circuit reports the read timing and the read position to each of the plurality of storage circuits.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a detailed configuration diagram of a transceiver circuit in accordance with embodiments;
FIG. 5 is a detailed configuration diagram of a buffer circuit in accordance with embodiments;
FIG. 7 is a timing chart for a chip on a reception side with received data including no errors;
FIG. 8 is a timing chart for a chip on a reception side with received data including errors;
FIG. 9 is a timing chart for a chip on a reception side with received data including errors;
FIG. 12 illustrates the configuration of a chip on a reception side in accordance with a comparative example;
FIG. 14 is a configuration diagram of a system in accordance with a comparative example.

DESCRIPTION OF EMBODIMENTS

Figure 1:
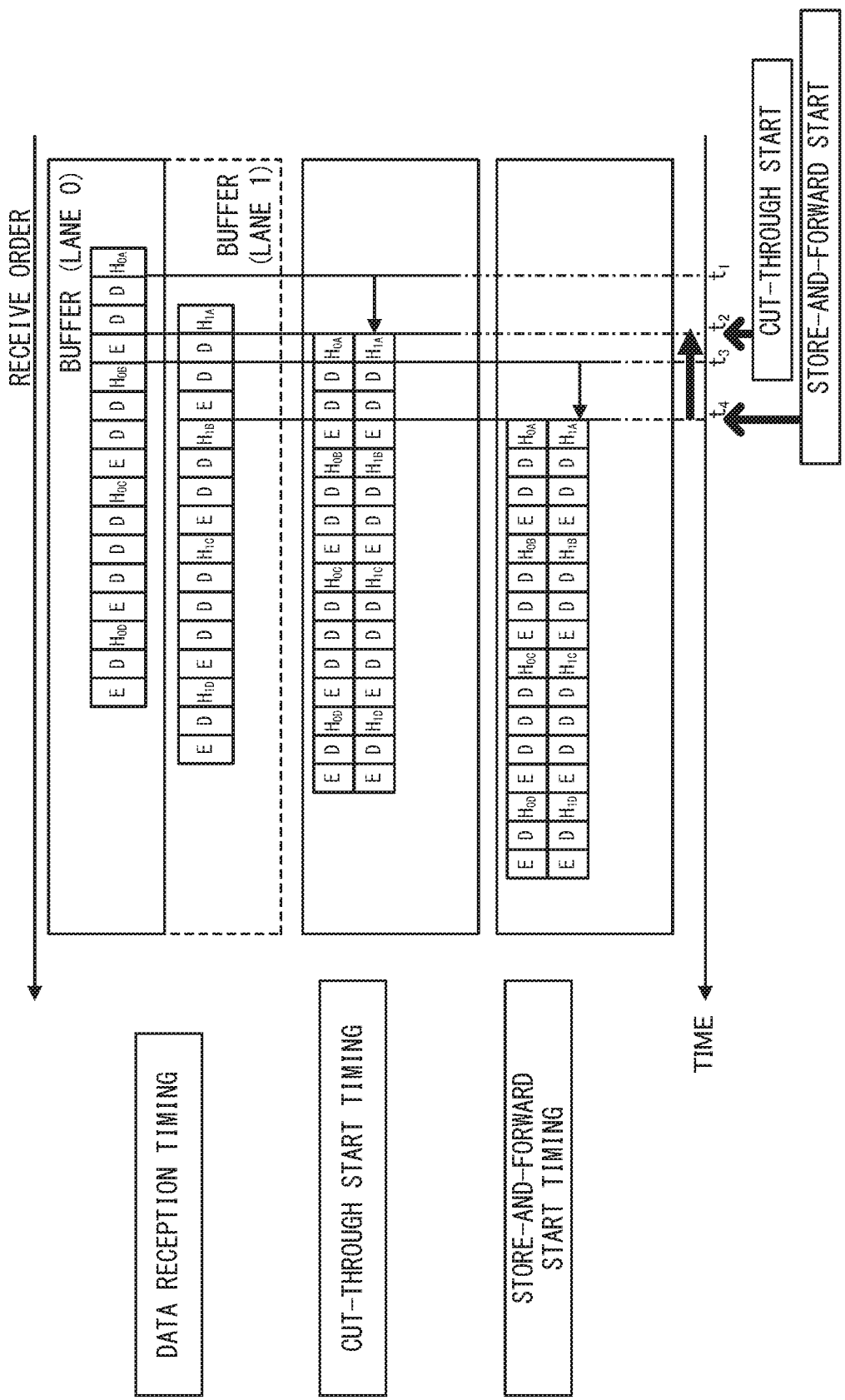
FIG. 1 illustrates respective data transmission timings for a cut-through scheme and a store-and-forward scheme.

The following describes embodiments by referring to the drawings.

A reception circuit stores data received from individual lanes in a plurality of buffers and reads data from the plurality of buffers while equalizing skews between the lanes.

Data transfer schemes include a store-and-forward scheme and a cut-through scheme. The store-and-forward scheme is such that packets are aligned and sent to a block on a subsequent stage when the end of each packet is detected after the beginning of each packet arrives. The cut-through scheme is such that packets start to be aligned and output to a block on a subsequent stage when the beginning of each packet is detected. Accordingly, the cut-through scheme involves a latency that is smaller than that in the store-and-forward scheme.

When skews between lanes are fixed, a communication latency can be shortened by performing speculative processing at a particular timing that can be estimated, thereby allowing a transfer based on the cut-through scheme (cut-through transfer) to be performed.

However, for example, arriving packets may each have a different skew. When skews are different like this, i.e., when a skew variation is present, it will be difficult to perform the cut-through transfer.

When a skew variation is large, it is difficult to perform the cut-through transfer in the conventional art. This is because timing estimation would fail, and thus data of transferred packets would be destroyed, thereby decreasing the transfer performance. Performing the conventional state multiplexing in order to prevent a failure of timing estimation will result in an especially wide area being needed to mount an inter-lane synchronization/matching circuit, thereby causing a problem of a decrease in the performance.

An arrival timing delay and a transmission error cannot be distinguished. As a result, error propagation is not limited, performance deterioration is not limited, and continuous operations are not ensured (Quality of Service (QoS) is not ensured). Accordingly, it would be difficult to perform a practical cut-through transfer under this condition.

In the conventional circuit structures (physical coding sublayers (PCSs), alignment circuits, and symbol-lock circuits, among other things), a small number of lanes are arranged in parallel and a circuit scale is relatively small and thus a skew variation can be ignored. Accordingly, pieces of data of different lanes independent of each other are merged in almost no case, and it is presumed that skews are not dynamic but static. When packets are aligned at almost fixed timings, i.e., when a skew variation can be ignored, the positions and timings of packet boundaries (alignment markers) are almost fixed. Hence, a communication latency can be shortened by performing speculative processing at a particular timing that can be estimated. Thus, the cut-through transfer can be performed.

However, when a skew variation such as cycle gaps occurs, alignment between timings is not ensured, and it will be difficult to estimate the position or timing of an alignment marker. In such a situation, if the cut-through function is enabled as in the conventional art so as to send packets to a subsequent stage at a timing that can be estimated, then format-broken packets could be sent to the subsequent stage due to skews that may be occasionally changed, thereby leading to an error. In particular, transferred data is discarded. Discarding data leads to a correction such as a retransmission, and this puts a large penalty on a transfer latency or bandwidth. Accordingly, if a skew variation has become apparent, it would be difficult to perform the cut-through control based on a timing estimation as in the conventional art.

The problem above is not easily solved in the conventional art because: it is difficult to address the determination of a timing and an error in a packet; and although any type of error could occur, it is desirable that a packet processing timing is determined while maintaining a particular QoS. It is desirable to consider, for example, a fact that the system is prevented from failing due to certain temporary failures that could occur periodically and a fact that the implementation of continuous operations is preferable to be ensured.

When a skew variation is large, a timing at which alignment markers are aligned is not determined, i.e., no factors are present to allow a fixed timing to be determined. Hence, a fixed timing at which packets are sent in a cut-through manner is not obtained. A transmission can be started basically at a moment at which expected data has been provided for all lanes, and hence expected-value matching is performed for generally all lanes. This means that the timing is not fixed but becomes dynamic. The timing before the data is provided is different for each lane, and hence performing the cut-through control will involve preparing a corresponding buffer.

Destroyed data could reach the reception side. If the destroyed data is not properly discarded, data of the destroyed packet could disrupt the control. The simplest control is reading pieces of data that have arrived at the individual lanes in order of arrival without checking the content thereof. However, if one piece of data is destroyed and lost, incorrect packet combinations will be provided on the lanes of the reception side, and this condition will be maintained. Hence, if control information is not readjusted, the error will continue eternally, thereby causing the communication path to hang. Accordingly, some kind of matching process is desirable to check the content of arriving packets.

In the conventional art, the size of buffers for aligning the starts of reception timings and the size of matching circuits for checking the content of lanes are quite large. This is especially because the matching circuits are directed to the total matching for all lanes and are provided for all timing buffers. In decreasing the size of the circuit, simply removing circuits could result in a loss of failure tolerance since it is not known which lane degenerates by physical damage.

FIG. 1 illustrates respective data transmission timings for a cut-through scheme and a store-and-forward scheme.

The upper side of the upper portion of FIG. 1 indicates received data and reception timings for a buffer of lane 0, and the lower side indicates received data and reception timings for a buffer of lane 1. In FIG. 1, the rightmost data is the initial data the buffer has received, and one piece of data received prior to another piece of data is located to the right of this other piece of data.

The buffer of lane 0 receives and stores four packets (first-fourth packets) in order as received data. The first packet includes header $H_{0A}$, two pieces of data D, and end data E. The second packet includes header $H_{0B}$, two pieces of data D, and end data E. The third packet includes header Hoe, three pieces of data D, and end data E. The fourth packet includes header $H_{0D}$, one piece of data D, and end data E.

The buffer of lane 1 receives and stores four packets (fifth-eighth packets) in order as received data. The fifth packet includes header $H_{1A}$, two pieces of data D, and end data E. The sixth packet includes header $H_{1B}$, two pieces of data D, and end data E. The seventh packet includes header $H_{1C}$, three pieces of data D, and end data E. The eighth packet includes header $H_{1D}$, one piece of data D, and end data E.

A pair of the first and fifth packets, a pair of the second and sixth packets, and a pair of the third and seventh packets, and a pair of the fourth and eighth packets each is desired to be output at the same timing.

The reception timing of the received data of lane 1 has been delayed by two cycles in comparison with the reception timing of the received data of lane 0.

The middle portion of FIG. 1 indicates a transmission timing for the cut-through scheme.

Assume that the cut-through scheme is used in the middle portion of FIG. 1 in a manner such that pieces of received data of lanes 0 and 1 are output after skews of these pieces of data are equalized.

At time $t_1$, the header $H_{0A}$ of the first packet is judged to have been received, and at time $t_2$, the header $H_{1A}$ of the fifth packet is judged to have been received. In the cut-through scheme, at a moment at which the beginnings (headers) of the two packets are received, the packets are aligned and starts to be output to a subsequent stage. Accordingly, at time $t_2$, received data starts to be output from the buffer of lane 0 in order starting from header $H_{0A}$, and received data starts to be output from the buffer of lane 1 in order starting from header $H_{1A}$.

The lower portion of FIG. 1 indicates a transmission timing for the stand-and-forward scheme.

Assume that the stand-and-forward scheme is used in the lower portion of FIG. 1 in a manner such that pieces of received data of lanes 0 and 1 are output after skews of these pieces of data are equalized.

At time $t_3$, the end data E of the first packet is judged to have been received, and at time $t_4$, the end data E of the fifth packet is judged to have been received. In the stand-and-forward scheme, at a moment at which the end data of the two packets are received, the packets are aligned and starts to be output to a subsequent stage. Accordingly, at time $t_4$, received data starts to be output from the buffer of lane 0 in order starting from header $H_{0A}$, and received data starts to be output from the buffer of lane 1 in order starting from header $H_{1A}$.

In FIG. 1, the cut-through scheme is such that the packets are output to the subsequent stage three cycles before the packets are output in the stand-forward scheme, i.e., the cut-through scheme has a superior transfer latency. However, the packets in the cut-through scheme are output to the subsequent stage without checking whether the packets are destroyed, and hence an error could occur in the end. In this case, an error discarding (nullification) instruction could be given. As the circuit scale becomes larger and the processing becomes more complicated, there will be a longer time before the error discarding instruction is given, and hence it will become more difficult to stop the propagation of the error. Simplifying the processing and reducing the circuit scale will allow the cut-through scheme to be implemented more easily.

Figure 2:
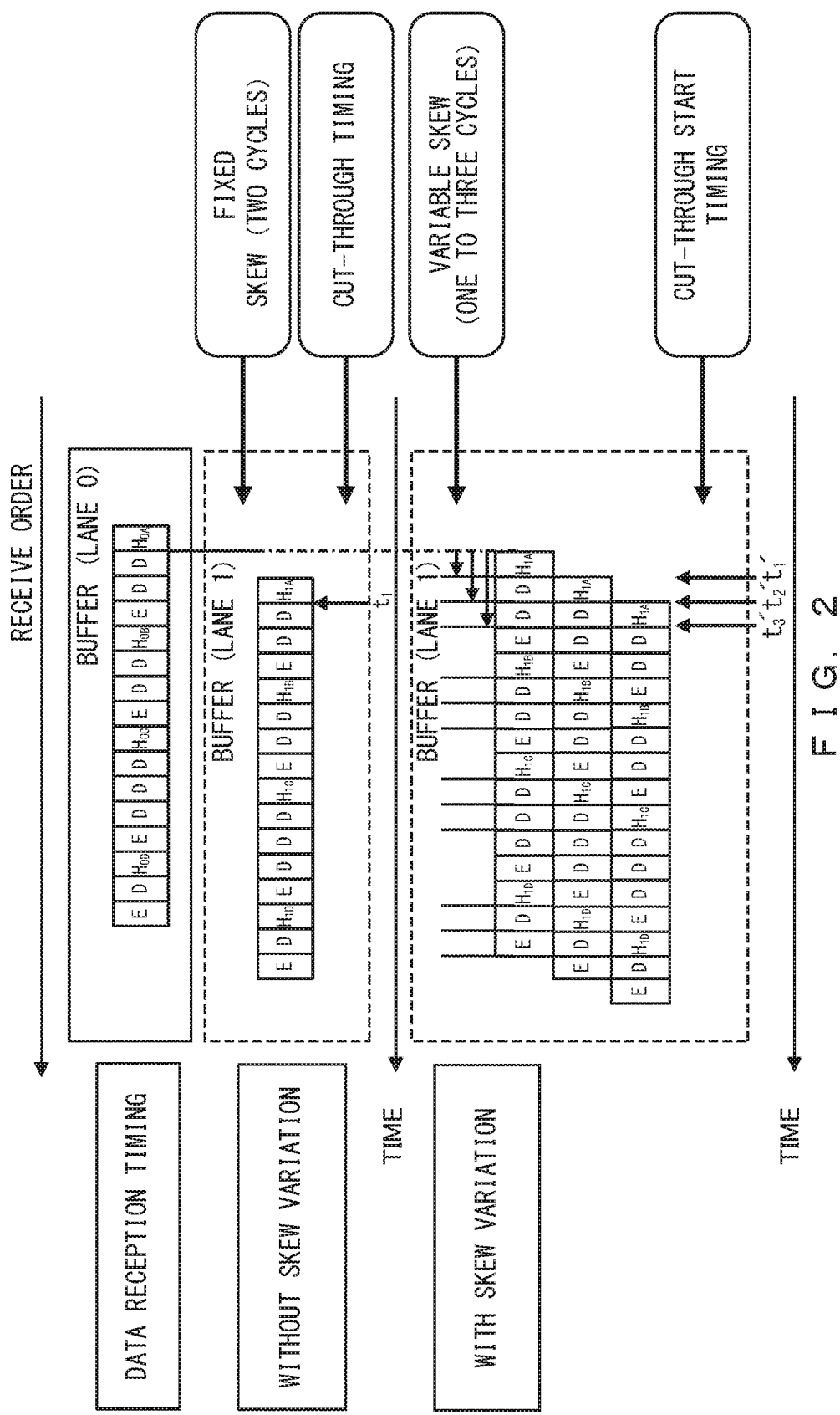
FIG. 2 illustrates respective data transmission timings for a cut-through scheme in a situation without a skew variation and a situation with a skew variation.

FIG. 2 illustrates respective data transmission timings for the cut-through scheme in a situation without a skew variation and a situation with a skew variation.

The upper portion of FIG. 2 indicates received data and reception timings for a buffer of lane 0.

The middle portion of FIG. 2 indicates received data and reception timings for the buffer of lane 1 for a situation without a skew variation. The middle portion of FIG. 2 indicates a situation without a skew variation, i.e., a situation in which skews are fixed. In the middle portion of FIG. 2, the reception timing of received data of lane 1 is delayed by two cycles in comparison with the reception timing of received data of lane 0.

Note that the received data of lanes 0 and 1 in FIG. 2 is similar to the received data of lanes 0 and 1 in FIG. 1.

Assume that under a condition in which the received data and the reception timing of the buffer of lane 1 are those indicated in the middle portion of FIG. 2, the cut-through scheme is used such that pieces of received data of lanes 0 and 1 are output after the skews of these pieces of data are equalized.

At time $t_1$, a header $H_{1A}$ of a fifth packet is judged to have been received. Before time $t_1$, a header $H_{0A}$ of a first packet is received.

In this case, at a moment at which the beginnings (headers) of the two packets are received, the packets are aligned and starts to be output to a subsequent stage. Accordingly, at time $t_2$, received data starts to be output from the buffer of lane 0 in order starting from header $H_{0A}$, and received data starts to be output from the buffer of lane 1 in order starting from header $H_{1A}$.

The lower portion of FIG. 2 indicates received data and reception timings for the buffer of lane 1 for a situation with a skew variation. The lower portion of FIG. 2 indicates a situation with a skew variation, i.e., a situation in which skews change. In the lower portion of FIG. 2, the reception timings of pieces of received data of upper, middle, and lower lanes 1 are respectively delayed by one, two, and three cycles in comparison with the reception timing of the received data of lane 0.

When the reception timing of the received data of lane 1 is delayed by one cycle in comparison with the reception timing of the received data of lane 0, at time $t'_1$, a header $H_{1A}$ of a fifth packet is judged to have been received. At time $t'_1$, received data starts to be output from the buffer of lane 0 in order starting from header $H_{0A}$, and received data starts to be output from the buffer of lane 1 in order starting from header $H_{1A}$.

When the reception timing of the received data of lane 1 is delayed by two cycles in comparison with the reception timing of the received data of lane 0, at time $t'_2$, the header $H_{1A}$ of the fifth packet is judged to have been received. At time $t'_2$, received data starts to be output from the buffer of lane 0 in order starting from header $H_{0A}$, and received data starts to be output from the buffer of lane 1 in order starting from header $H_{1A}$.

When the reception timing of the received data of lane 1 is delayed by three cycles in comparison with the reception timing of the received data of lane 0, at time $t'_3$, the header $H_{1A}$ of the fifth packet is judged to have been received. At time $t'_3$, received data starts to be output from the buffer of lane 0 in order starting from header $H_{0A}$, and received data starts to be output from the buffer of lane 1 in order starting from header $H_{1A}$.

In an environment without a skew variation, although skews could be generated between lanes, such skews are fixed. Once skews are determined, almost the same state is maintained. When skews are fixed, the cut-through timing comes after a certain period of time has elapsed since the reception timing of data received earlier. For other timings, the processing may be performed by determining that an error (arrival of a destroyed packet) has occurred.

When a skew variation is present, a skew could be different for each packet arrival.

When a skew variation is present, the number of cycles between the reception timing of following data of another lane and the reception timing of data of a lane that arrived earlier is unclear. In the first place, the fact that data has come does not always mean that the processing can be performed, and correct data could come just after this. Hence, it is difficult to determine that the outputting can be started using data that has currently arrived. Thus, when a skew variation is present, a certain amount of data is stored on the reception side, and an optimum piece of data is selected from the stored data. When a skew variation is present, skews are not aligned in either a buffer or a concerned buffer. There is a problem that in a situation in which timings are different, a timing just after those timings could be a real read timing, i.e., a problem that a read timing is difficult to determine.

Figure 3:
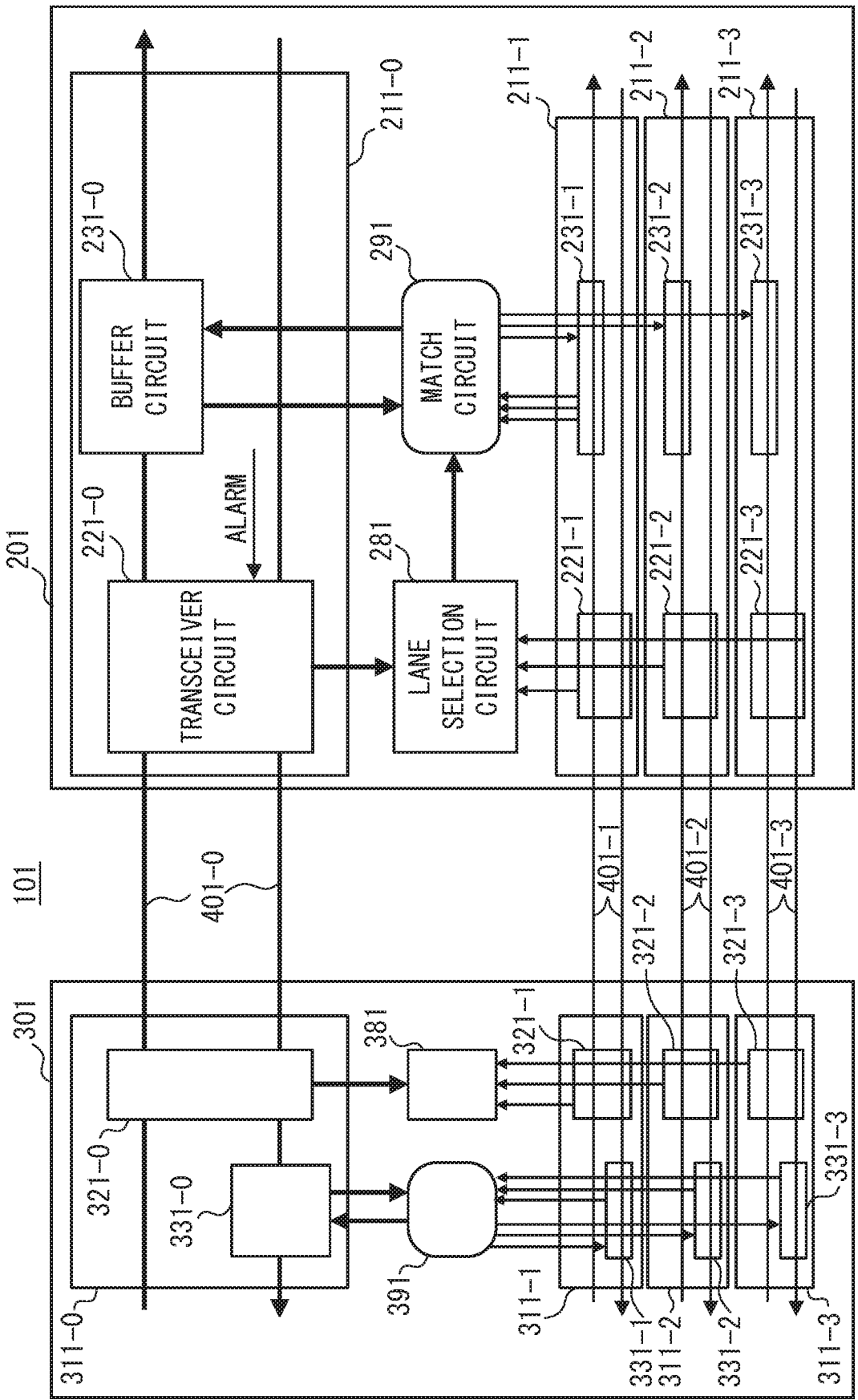
FIG. 3 is a configuration diagram of a system in accordance with embodiments.

FIG. 3 is a configuration diagram of a system in accordance with embodiments.

A system 101 includes chips 201 and 301. The chips 201 and 301 are circuits, e.g., large-scale integrations (LSIs).

The chips 201 and 301 are examples of a data transmission apparatus or data reception apparatus.

The chips 201 and 301 are connected via a plurality of lanes 401-$i$ ($i$=0 to 3). The lane is an exemplary transmission path. The chips 201 and 301 transmit/receive data to/from each other via a serial communication using the plurality of lanes 401-$i$. When data is transmitted from the chip 201 to the chip 301, the chip 201 generates a plurality of packets by dividing the data to be transmitted into as many pieces as the number of the lanes and transmits each of the plurality of generated packets to the chip 301 via a corresponding lane 401-$i$. When, for example, four packets $P_i$ are generated by dividing certain data, a packet $P_i$ is transmitted to the chip 301 via a lane 401-$i$. In particular, each packet is transmitted to the chip 301 via a different lane. The chip 301 reconstructs the transmitted data from the plurality of received packets. Similarly, when data is transmitted from the chip 301 to the chip 201, the chip 301 generates a plurality of packets by dividing the data into as many pieces as the number of the lanes and transmits each of the plurality of generated packets to the chip 201 via a corresponding lane 401-$i$. The chip 201 reconstructs the transmitted data from the plurality of received packets.

The chip 201 includes lane-specific circuits 211-$i$, a lane selection circuit 281, and a match circuit 291.

The lane-specific circuit 211-$i$ includes a transceiver circuit 221-$i$ and a buffer circuit 231-$i$.

The transceiver circuit 221-$i$ receives a packet from the chip 301 via a lane 401-$i$. The transceiver circuit 221-$i$ transfers the received packet to the buffer circuit 231-$i$, detects an error in the received packet, and outputs error information to the lane selection circuit 281. Information (alarm) from higher-level firmware to be used for the error information is input to the transceiver circuit 221-$i$. The transceiver circuit 221-$i$ transmits a packet to the chip 301 via the lane 401-$i$.

The buffer circuit 231-$i$ stores received data. In accordance with a control signal received from the match circuit 291, the buffer circuit 231-$i$ reads and outputs data stored therein to a processing circuit (not illustrated) disposed on a subsequent stage within the chip 201. Accordingly, pieces of data with skews aligned are output from lane-specific circuits 211-$i$. The buffer circuit 231-$i$ is, for example, a first-in first-out (FIFO) circuit or a random access memory (RAM). The buffer circuit 231-$i$ is an exemplary storage circuit.

In accordance error information received from the transceiver circuit 221-$i$, the lane selection circuit 281 selects any of the lanes 401-$i$ and outputs a selection signal indicating the selected lane to the match circuit 291. The lane selection circuit 281 is an exemplary selection circuit.

In accordance with entries received from the buffer circuit 231-$i$ and a selection signal received from the lane selection circuit 281, the match circuit 291 calculates read pointer values indicating data read positions for the individual buffer circuits 231-$i$. The match circuit 291 transmits, to the buffer circuit 231-$i$, control information that includes a read timing and a read pointer value indicating a data read position, the control information serving as an instruction to read data. The match circuit 291 is an exemplary report circuit.

The chip 301 includes lane-specific circuits 311-$i$, a lane selection circuit 381, and a match circuit 391. The lane-specific circuit 311-$i$ includes a transceiver circuit 321-$i$ and a buffer circuit 331-$i$. Functions of the transceiver circuit 321-$i$, the buffer circuit 331-$i$, the lane selection circuit 381, and the match circuit 391 are respectively similar to those of the transceiver circuit 221-$i$, the buffer circuit 231-$i$, the lane selection circuit 281, and the match circuit 291, and descriptions thereof are omitted herein.

FIG. 4 is a detailed configuration diagram of a transceiver circuit in accordance with embodiments.

A transceiver circuit 221-$i$ includes an error detection circuit 222-$i$, an error analysis circuit 223-$i$, a transmission circuit 224-$i$, and a lane-selection-information output circuit 225-$i$.

A packet received by the transceiver circuit 221-$i$ is transferred to the error detection circuit 222-$i$ and the buffer circuit 231-$i$.

The error detection circuit 222-$i$ detects an error in the received packet and outputs a detection result to the buffer circuit 231-$i$ and the error analysis circuit 223-$i$.

The error analysis circuit 223-$i$ performs statistical processing of the detection result provided by the error detection circuit 222-$i$. For example, the error analysis circuit 223-$i$ may count and save an error detection count at certain time intervals. For example, the error analysis circuit 223-$i$ may increment the error detection count within an internal register and reset the count upon receipt of a reset signal from an outside. For example, the error analysis circuit 223-$i$ may output, as an analysis result, an error detection count provided at certain time intervals to the transmission circuit 224-$i$ and the lane-selection-information output circuit 225-$i$.

The transmission circuit 224-$i$ generates a packet that includes data to be transmitted, an alarm (Send), or an analysis result provided by the error analysis circuit 223-$i$ and transmits the packet to the transceiver circuit 321-$i$ of the chip 301. The data to be transmitted refers to data to be transmitted to the chip 301. The alarm (Send) refers to information used to select a lane 401-$i$ to be used by the chip 301 to transmit packets. The alarm (Send) is, for example, information to give an instruction to not use a lane 401-$i$. The chip 301 on the transmission side does not use a certain lane 401-$i$ when, for example, an error detection count received from the transmission circuit 224-$i$ of the lane 401-$i$ is equal to or higher than a threshold. Accordingly, the occurrence of errors in received data can be reduced.

The lane-selection-information output circuit 225-$i$ receives an analysis result provided by the error analysis circuit 223-$i$. The lane-selection-information output circuit 225-$i$ may also receive an alarm (Self).

The alarm (Self) is, for example, information indicating an abnormality in the chip 201 or lane 401-$i$ sensed by higher-level firmware, or information indicating that the lane 401-$i$ is prohibited from being used. The alarm (Self) is, for example, information for giving an instruction to not use the lane 401-$i$ and indicates an error detection count of a prescribed value (quite large number).

The lane-selection-information output circuit 225-$i$ outputs error information to the lane selection circuit 281 in accordance with an analysis result and an alarm (Self). The error information is, for example, an error detection count provided at certain time intervals that is indicated by an analysis result provided by the error analysis circuit 223-$i$. The error information is also, for example, an error detection count of a prescribed value indicated by the alarm (Self). The error information is also, for example, the sum of an error detection count provided at certain time intervals that is indicated by an analysis result provided by the error analysis circuit 223-$i$ and an error detection count indicated by the alarm (Self).

FIG. 5 is a detailed configuration diagram of a buffer circuit in accordance with embodiments.

A buffer circuit 231-$i$ includes a block circuit 232-$i$ and a read pointer 233-$i$.

The block circuit 232-$i$ stores packets received from a transceiver circuit 221-$i$ in order of arrival. Upon receipt of a report of detection of a packet error from an error detection circuit 222-$i$ as an analysis result, the block circuit 232-$i$ attaches an error mark to the packet and discards this packet. The block circuit 232-$i$ detects and outputs a header of a stored packet to the match circuit 291 as an entry. The entry has added thereto the position (pointer value) of the header within the block circuit 232-$i$. When a plurality of packets are stored, the block circuit 232-$i$ detects and outputs headers of the individual packets to the match circuit 291 as entries.

The block circuit 232-$i$ reads a packet in accordance with a read instruction from the match circuit 291 and outputs the packet to a processing circuit (not illustrated) disposed on a subsequent stage. The read instruction includes a read timing and a read pointer value indicating a read position within the block circuit 232-$i$.

The read pointer 233-$i$ outputs a read instruction received from the match circuit 291 to the block circuit 232-$i$.

Figure 6:
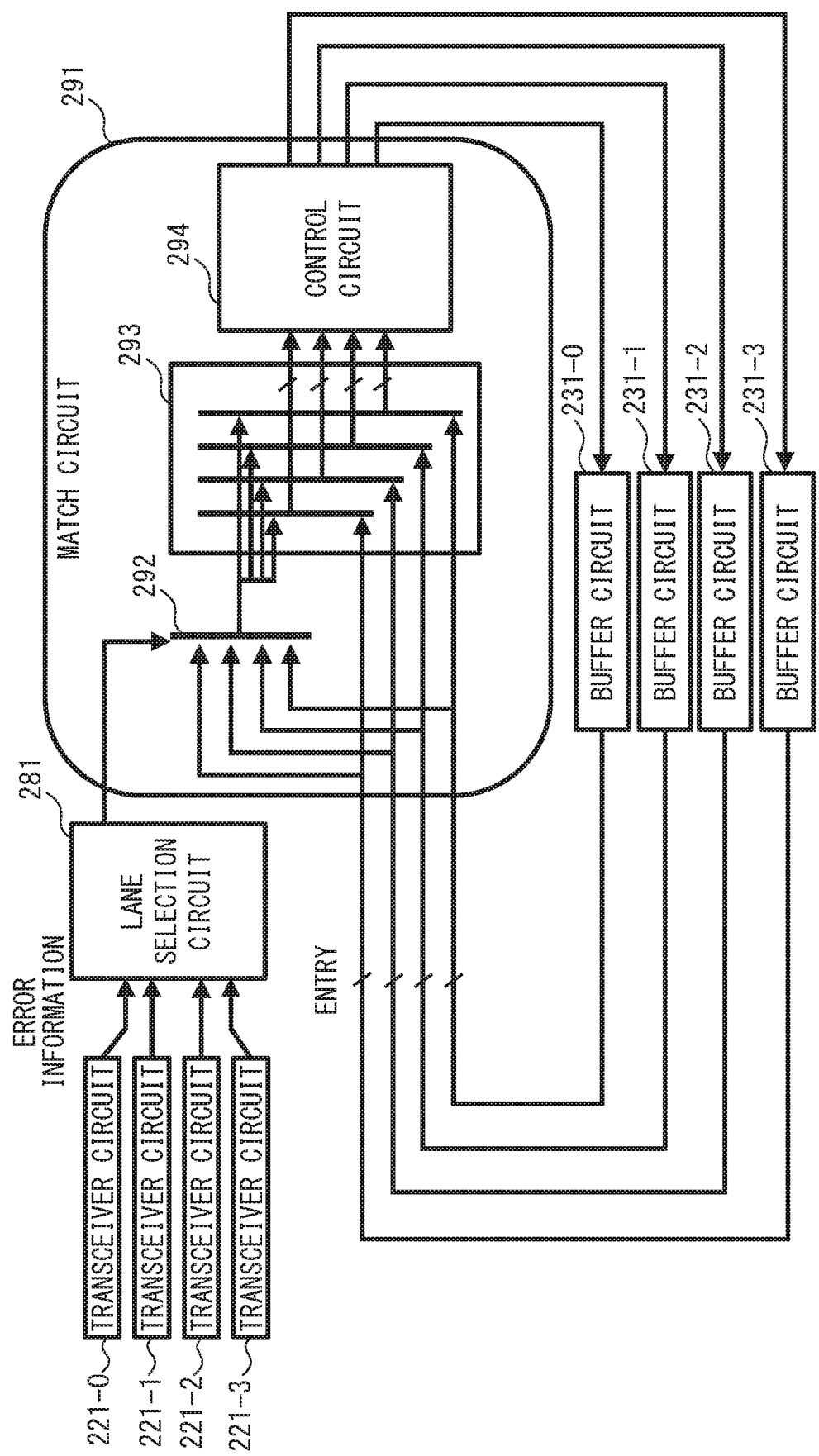
FIG. 6 is a detailed configuration diagram of a match circuit in accordance with embodiments.

FIG. 6 is a detailed configuration diagram of a match circuit in accordance with embodiments.

The match circuit 291 includes a selector 292, a comparison circuit 293, and a control circuit 294.

The lane selection circuit 281 receives error information from each of transceiver circuits 221-$i$ and selects any of the lanes 401-$i$ according to the error information. More specifically, the lane selection circuit 281 selects a lane 401-$i$ of a transceiver circuit 221-$i$ that has transmitted error information indicating the smallest error detection count. Using the least recently used (LRU) or the round robin, the lane selection circuit 281 may select any of lanes 401-$i$ of transceiver circuits 221-$i$ that have transmitted error information indicating an error detection count equal to or less than a threshold. The lane selection circuit 281 outputs selection information indicating a selected lane 401-$i$ to the selector 292.

The selector 292 receives selection information from the lane selection circuit 281 and entries from the individual buffer circuits 231-$i$. The selector 292 selects an entry received from the buffer 231-$i$ of a lane 401-$i$ indicated by the selection information from among the received entries and outputs the selected entry to the comparison circuit 293. Accordingly, the entry of a lane having the fewest errors in received packets serves as a main factor in matching performed by the comparison circuit 293.

The comparison circuit 293 receives an entry selected by the selector 292 and entries from the individual buffer circuits 231-$i$. The comparison circuit 293 matches (compares) the entry selected by the selector 292 against each of the entries of the buffer circuits 231-$i$. The comparison circuit 293 identifies an entry matching the selected entry from among the entries of the buffer circuits 231-$i$. An entry matching the selected entry refers to an entry to be read at the same timing as the selected entry. For example, a common identifier may be included in the headers of a plurality of packets to be read at the same timing. Accordingly, entries to be read at the same timing can be identified by determining whether entries under matching include the same identifier as that included in the selected entry.

When an entry matching an entry selected from the entries of the buffer circuits 231-$i$ of all lanes excluding a selected lane is identified, the control circuit 294 outputs, to the buffer 231-$i$, a read instruction that includes a read timing and a read pointer value indicating the position (read position) of the entry matching the selected entry within the block circuit 232-$i$. For example, the control circuit 294 may determine, as a read timing, a timing a prescribed number of cycles after the present time.

FIG. 7 is a timing chart for a chip on a reception side with received data including no errors. In FIG. 7, the chip 201 is a chip on the reception side.

In FIG. 7, IN(Li) indicates data from a lane 401-$i$ input to a lane-specific circuit 211-$i$, H indicates a header (beginning), D indicates data (neither beginning nor end), E indicates end data, and bar (-) indicates that data is not present. Note that one packet includes a header H, one or more pieces of data D, and end data E.

SR(Li) indicates information on an error in received data of a lane 401-$i$. ED indicates an output of an error detection circuit 222-$i$, EA indicates an output of an error analysis circuit 223-$i$, and LSI indicates an output of a lane-selection-information output circuit 225-$i$. In FIG. 7, received data includes no errors, and hence ED, EA, and LSI are not active but are blank.

BF(Li) indicates the buffer circuit 231-$i$ of a lane 401-$i$. E indicates writing to a block circuit 232-$i$. RD indicates reading based on an instruction from the match circuit 291.

MC indicates the match circuit 291. LS indicates selection information from the lane selection circuit 281. CT indicates a read instruction (control) from the control circuit 294. In FIG. 7, LS is "0", which indicates lane 401-0.

OUT(all) indicates outputs of all buffer circuits 231-$i$, and in FIG. 7, four pieces of data are read in synchronization with each other at a certain time.

In FIG. 7, a first packet to be input to lane-specific circuit 211-0 ($H_1$, $D_1$, $D_5$, $E_1$), a first packet to be input to lane-specific circuit 211-1 ($H_2$, $D_2$, $D_6$, $E_2$), and a first packet to be input to lane-specific circuit 211-2 ($H_3$, $D_3$, $D_7$, $E_3$) respectively arrive at lane-specific circuits 211-0 to 211-2 at the same timing. A first packet to be input to lane-specific circuit 211-3 ($H_4$, $D_4$, $D_8$, $E_4$) arrives at lane-specific circuit 211-3 one cycle after the first packets arrive at lane-specific circuits 211-0 to 211-2.

A second packet to be input to lane-specific circuit 211-0 ($H_5$, $D_9$, $E_5$), a second packet to be input to lane-specific circuit 211-1 ($H_6$, $D_{10}$, $E_6$), and a second packet to be input to lane-specific circuit 211-2 ($H_7$, $D_{11}$, $E_7$) respectively arrive at lane-specific circuits 211-0 to 211-2 at the same timing. A second packet to be input to lane-specific circuit 211-3 ($H_8$, $D_{12}$, $E_8$) arrives at lane-specific circuit 211-3 one cycle after the second packets arrive at lane-specific circuits 211-0 to 211-2.

A third packet to be input to lane-specific circuit 211-0 ($H_9$, $D_{13}$, $D_{17}$, $E_9$) and a third packet to be input to lane-specific circuit 211-1 ($H_{10}$, $D_{14}$, $D_{18}$, $E_{10}$) respectively arrive at lane-specific circuits 211-0 and 211-1 at the same timing.

A third packet to be input to lane-specific circuit 211-2 ($H_{11}$, $D_{15}$, $D_{19}$, $E_{11}$) and a third packet to be input to lane-specific circuit 211-3 ($H_{12}$, $D_{16}$, $D_{20}$, $E_{12}$) arrive at lane-specific circuits 211-2 and 211-3 one cycle after the third packets arrive at lane-specific circuits 211-0 to 211-1.

First packets input to lane-specific circuits 211-$i$ are preferably read in synchronization with each other from buffer circuits 231-$i$. Second packets input to lane-specific circuits 211-$i$ are preferably read in synchronization with each other from buffer circuits 231-$i$. Third packets input to lane-specific circuits 211-$i$ are preferably read in synchronization with each other from buffer circuits 231-$i$.

When packets are input to individual lane-specific circuits 211-$i$, each packet is transferred to a buffer circuit 231-$i$ and written to a block circuit 232-$i$. At time $t_3$, headers $H_1$ to $H_3$ are respectively written to block circuits 232-0 to 232-2. At time $t_4$, header $H_3$ is written to block circuit 232-3. Headers $H_1$ to $H_4$ are input to the match circuit 291 as entries.

At time $t_3$, selection information LS is "0", which indicates lane 401-0, and hence the match circuit 291 selects header $H_1$ as a main factor.

The match circuit 291 identifies headers $H_2$ and $H_3$ as entries that match header $H_1$. When header $H_4$ is input to the match circuit 291 one cycle after headers $H_1$ to $H_3$ are input, header $H_4$ is identified as an entry that matches header $H_1$. Accordingly, entries ($H_2$ to $H_4$) matching the selected entry (header $H_1$) are identified within the entries of the buffer circuits 231-$i$ of all lanes excluding the selected lane 401-0.

At time $t_5$, the match circuit 291 transmits a read instruction CT to each buffer circuit 231-$i$. The read instruction CT directed to buffer circuit 231-0 includes the position of header $H_1$ within block circuit 232-0 and a read timing for header $H_1$ (time $t_6$). The read instruction CT directed to buffer circuit 231-1 includes the position of header $H_2$ within block circuit 232-1 and a read timing for header $H_2$ (time $t_6$). The read instruction CT directed to buffer circuit 231-2 includes the position of header $H_3$ within block circuit 232-2 and a read timing for header $H_3$ (time $t_6$). The read instruction CT directed to buffer circuit 231-3 includes the position of header $H_4$ within block circuit 232-3 and a read timing for header $H_4$ (time $t_6$).

According to the read instruction CT, the buffer circuits 231-$i$ read and output headers $H_1$ to $H_4$ (=$H_{1-4}$) at time $t_6$. Afterward, the buffer circuits 231-$i$ synchronously read and output pieces of data of the packets that follow headers $H_1$ to $H_4$ ($D_1$ to $D_4$ (=$D_{1-4}$), $D_5$ to $D_8$ (=$D_{5-8}$), and $E_1$ to $E_4$ (=$E_{1-4}$)).

Second packets input to the lane-specific circuits 211-$i$ are also written to the block circuits 232-$i$ and undergo entry matching performed by the match circuit 291. At time $t_{10}$, headers $H_5$ to $H_8$ (=$H_{5-8}$) are read and output from the buffer circuits 231-$i$.

Third packets input to the lane-specific circuits 211-$i$ are also written to the block circuits 232-$i$ and undergo entry matching performed by the match circuit 291.

The match circuit 291 identifies header $H_{10}$ as an entry matching header $H_9$. Third packets input to lane-specific circuits 211-2 and 211-3 arrive at lane-specific circuits 211-2 and 211-3 one cycle after third packets arrive at lane-specific circuits 211-0 and 211-1.

When headers $H_{11}$ and $H_{12}$ are input to the match circuit 291 one cycle after headers $H_9$ and $H_{10}$ are input, headers $H_{11}$ and $H_{12}$ are identified as entries matching header $H_9$. Accordingly, entries ($H_{10}$ to $H_{12}$) matching the selected entry (header $H_9$) are identified within the entries of the buffer circuits 231-$i$ of all lanes excluding the selected lane 401-0.

At time $t_{13}$, the match circuit 291 transmits a read instruction CT to each buffer circuit 231-$i$. The read instruction CT directed to buffer circuit 231-0 includes the position of header $H_9$ within block circuit 232-0 and a read timing for header $H_9$ (time $t_{14}$). The read instruction CT directed to buffer circuit 231-1 includes the position of header $H_{10}$ within block circuit 232-1 and a read timing for header $H_{10}$ (time $t_{14}$). The read instruction CT directed to buffer circuit 231-2 includes the position of header $H_{11}$ within block circuit 232-2 and a read timing for header $H_{11}$ (time $t_{14}$). The read instruction CT directed to buffer circuit 231-3 includes the position of header $H_{12}$ within the block circuit 232-3 and a read timing for header $H_{12}$ (time $t_{14}$).

According to the read instruction, the buffer circuits 231-$i$ read and output headers $H_9$ to $H_{12}$ (=$H_{9-12}$) at time $t_{14}$.

FIG. 8 is a timing chart for a chip on a reception side with received data including errors. In FIG. 8, the chip 201 is a chip on the reception side.

In FIG. 8, IN(Li) indicates data from a lane 401-$i$ input to a lane-specific circuit 211-$i$, H indicates a header (beginning), D indicates data (neither head nor end), E indicates end data, and bar (-) indicates that data is not present. Note that one packet includes a header H, one or more pieces of data D, and end data E. The data input to the lane-specific circuits 211-$i$ and the timing of the input are similar to those depicted in FIG. 7.

SR(Li) indicates information on an error in received data of a lane 401-$i$. ED indicates an output of an error detection circuit 222-$i$, EA indicates an output of an error analysis circuit 223-$i$, and LSI indicates an output of a lane-selection-information output circuit 225-$i$. ED=Er indicates that an error has been detected. EA=x and LSI=x (x is an integer that is 0 or larger) indicate an error detection count counted by the error analysis circuit 223-$i$. An error is detected using a cyclic redundancy check (CRC) that accompanies the end data E of a packet.

UPDT indicates a reset signal directed to an error analysis circuit 223-$i$. Upon receipt of the reset signal, the error analysis circuit 223-$i$ resets the error detection count that has been counted, i.e., sets the count to 0. UPDT=1 indicates that the reset signal is in ON state. If the error detection count was not reset, lanes would be selected using especially old data (e.g., data that has been accumulated for the past several months), and this would be inappropriate.

MC indicates the match circuit 291. LS indicates selection information from the lane selection circuit 281. In FIG. 8, the initial value of LS is "0", which indicates lane 401-0.

At time $t_5$, error detection circuit 222-0 detects an error in a first packet input to lane-specific circuit 211-0 (ED=Er). At time $t_6$, one is added to the error detection count counted by error analysis circuit 223-0, the output of error analysis circuit 223-0 is EA=1, and the output of lane-selection-information output circuit 225-0 is LSI=1.

At time $t_5$, error detection circuit 222-2 detects an error in a first packet input to lane-specific circuit 211-2 (ED=Er). At time $t_6$, one is added to the error detection count counted by error analysis circuit 223-2, the output of error analysis circuit 223-2 is EA=1, and the output of lane-selection-information output circuit 225-2 is LSI=1.

At time $t_8$, error detection circuit 222-1 detects an error in a second packet input to lane-specific circuit 211-1 (ED=Er). At time $t_9$, one is added to the error detection count counted by error analysis circuit 223-1, the output of error analysis circuit 223-1 is EA=1, and the output of lane-selection-information output circuit 225-1 is LSI=1.

At time $t_8$, error detection circuit 222-2 detects an error in a second packet input to lane-specific circuit 211-2 (ED=Er). At time $t_8$, one is added to the error detection count counted by error analysis circuit 223-2, the output of error analysis circuit 223-2 is EA=2, and the output of lane-selection-information output circuit 225-2 is LSI=2.

At time $t_9$, the reset signal is in ON state (UPDT=1). Upon receipt of the reset signal, the error analysis circuit 223-$i$ resets the error detection count that has been counted, i.e., sets the count to 0. Accordingly, at time $t_{10}$, the output EA of the error analysis circuit 223-$i$ and the output LSI of the lane-selection-information output circuit 225-$i$ are reset, i.e., set to 0.

At time $t_9$, in response to the reset signal being put in ON state, the lane selection circuit 281 detects the lowest of the values of the outputs LSI of lane-selection-information output circuits 225-0 to 225-3 so as to select a lane associated with the lane associated with the smallest detection count for errors in received data. The lowest of the values of the outputs LSI of lane-selection-information output circuits 225-0 to 225-3 is the output of lane-selection-information output circuit 225-3 (=0).

Accordingly, at time $t_{10}$, the lane selection circuit 281 selects lane 401-3, and LS becomes "3", which indicates lane 401-3.

At time $t_{13}$, error detection circuit 222-0 detects an error in a third packet input to lane-specific circuit 211-0 (ED=Er). At time $t_{14}$, one is added to the error detection count counted by error analysis circuit 223-0, the output of error analysis circuit 223-0 is EA=1, and the output of lane-selection-information output circuit 225-0 is LSI=1.

FIG. 9 is a timing chart for a chip on a reception side with received data including errors. In FIG. 9, the chip 201 is a chip on the reception side. With reference to FIG. 9, descriptions will be given of matching performed by the match circuit 291 in a situation of error detection similar to the situation depicted in FIG. 8.

In FIG. 9, IN(Li) indicates data from a lane 401-$i$ input to a lane-specific circuit 211-$i$, H indicates a header (beginning), D indicates data (neither head nor end), E indicates end data, and bar (-) indicates that data is not present. Note that one packet includes a header H, one or more pieces of data D, and end data E. The data input to the lane-specific circuits 211-$i$ and the timing of the input are similar to those depicted in FIG. 7.

SR(Li) indicates information on an error in received data of a lane 401-$i$. ED indicates an output of an error detection circuit 222-$i$, EA indicates an output of an error analysis circuit 223-$i$, and LSI indicates an output of a lane-selection-information output circuit 225-$i$. ED=Er indicates that an error has been detected. EA=x and LSI=x (x is an integer that is 0 or larger) indicate an error detection count counted by the error analysis circuit 223-$i$. An error is detected using a cyclic redundancy check (CRC) that accompanies the end data E of a packet. The SR(Li) in FIG. 9 is similar to the SR(Li) in FIG. 8. In FIG. 9, only SR(L0) is indicated, and SR(L1) to SR(L3) are omitted.

BF(Li) indicates the buffer circuit 231-$i$ of a lane 401-$i$. E indicates writing to a block circuit 232-$i$. RD indicates reading based on an instruction from the match circuit 291. MC indicates the match circuit 291. LS indicates selection information from the lane selection circuit 281.

MC indicates the match circuit 291. LS indicates selection information from the lane selection circuit 281. CT indicates a read instruction (control) from the control circuit 294. In FIG. 9, the initial value of LS is "0", which indicates lane 401-0.

OUT(all) indicates outputs of all buffer circuits 231-$i$, and in FIG. 9, four pieces of data are read in synchronization with each other at a certain time.

When packets are input to individual lane-specific circuits 211-$i$, each packet is transferred to a buffer circuit 231-$i$ and written to a block circuit 232-$i$. At time $t_3$, headers $H_1$ to $H_3$ are respectively written to block circuits 232-0 to 232-2. At time $t_4$, header $H_3$ is written to block circuit 232-3. Headers $H_1$ to $H_4$ are input to the match circuit 291 as entries.

At time $t_3$, selection information LS is "0", which indicates lane 401-0, and hence the match circuit 291 selects header $H_1$ as a main factor.

The match circuit 291 identifies headers $H_2$ and $H_3$ as entries that match header $H_1$. When header $H_4$ is input to the match circuit 291 one cycle after headers $H_1$ to $H_3$ are input, header $H_4$ is identified as an entry that matches header $H_1$. Accordingly, entries ($H_2$ to $H_4$) matching the selected entry (header $H_1$) are identified within the entries of the buffer circuits 231-$i$ of all lanes excluding the selected lane 401-0.

At time $t_5$, the match circuit 291 transmits a read instruction CT to each buffer circuit 231-$i$. The read instruction CT directed to buffer circuit 231-0 includes the position of header $H_1$ within block circuit 232-0 and a read timing for header $H_1$ (time $t_6$). The read instruction CT directed to buffer circuit 231-1 includes the position of header $H_2$ within block circuit 232-1 and a read timing for header $H_2$ (time $t_6$). The read instruction CT directed to buffer circuit 231-1 includes the position of header $H_2$ within block circuit 232-2 and a read timing for header $H_2$ (time $t_6$). The read instruction CT directed to buffer circuit 231-2 includes the position of header $H_3$ within block circuit 232-2 and a read timing for header $H_3$ (time $t_6$). The read instruction CT directed to buffer circuit 231-3 includes the position of header $H_4$ within block circuit 232-3 and a read timing for header $H_4$ (time $t_6$).

According to the read instruction CT, the buffer circuits 231-$i$ read and output headers $H_1$ to $H_4$ (=$H_{1-4}$) at time $t_6$. Afterward, the buffer circuits 231-$i$ synchronously read and output pieces of data of the packets that follow headers $H_1$ to $H_4$ ($D_1$ to $D_4$ (=$D_{1-4}$), $D_5$ to $D_8$ (=$D_{5-8}$), and $E_1$ to $E_4$ (=$E_{1-4}$)).

Second packets input to the lane-specific circuits 211-$i$ are also written to the block circuits 232-$i$ and undergo entry matching performed by the match circuit 291. At time $t_{10}$ headers $H_5$ to $H_8$ (=$H_{5-8}$) are read and output from the buffer circuits 231-$i$.

As in FIG. 8, at time $t_{10}$, the lane selection circuit 281 selects lane 401-3, and LS becomes "3", which indicates lane 401-3.

Third packets input to the lane-specific circuits 211-$i$ are also written to the block circuits 232-$i$ and undergo entry matching performed by the match circuit 291.

At time $t_3$, selection information LS is "3", which indicates lane 401-3, and hence the match circuit 291 selects header $H_{12}$ as a main factor. In FIG. 7, header $H_9$ is selected as a main factor since LS=0. In FIG. 9, header $H_{12}$ is selected as a main factor since LS=3.

Third packets input to lane-specific circuits 211-2 and 211-3 arrive at lane-specific circuits 211-2 and 211-3 one cycle after third packets arrive at lane-specific circuits 211-0 and 211-1.

When headers $H_{11}$ and $H_{12}$ are input to the match circuit 291 one cycle after headers $H_9$ and $H_{10}$ are input, headers $H_9$ to $H_{11}$ are identified as entries matching header $H_{12}$. Accordingly, entries ($H_9$ to $H_{11}$) matching the selected entry (header $H_{12}$) are identified within the entries of the buffer circuits 231-$i$ of all lanes excluding the selected lane 401-3.

At time $t_{13}$, the match circuit 291 transmits a read instruction CT to each buffer circuit 231-$i$. The read instruction CT directed to buffer circuit 231-0 includes the position of header $H_9$ within block circuit 232-0 and a read timing for header $H_9$ (time $t_{14}$). The read instruction CT directed to buffer circuit 231-1 includes the position of header $H_{10}$ within block circuit 232-1 and a read timing for header $H_{10}$ (time $t_{14}$). The read instruction CT directed to buffer circuit 231-2 includes the position of header $H_{11}$ within block circuit 232-2 and a read timing for header $H_{11}$ (time $t_{14}$). The read instruction CT directed to buffer circuit 231-3 includes the position of header $H_{12}$ within block circuit 232-3 and a read timing for header $H_{12}$ (time $t_{14}$).

According to the read instruction, the buffer circuits 231-$i$ read and output headers $H_9$ to $H_{12}$ (=$H_{9-12}$) at time $t_{14}$.

Next, embodiments for enabling transfers based on the cut-through scheme in the presence of a skew variation will be indicated as comparative examples.

First, an area reduction based on a single lane in accordance with embodiments will be indicated.

Figure 10:
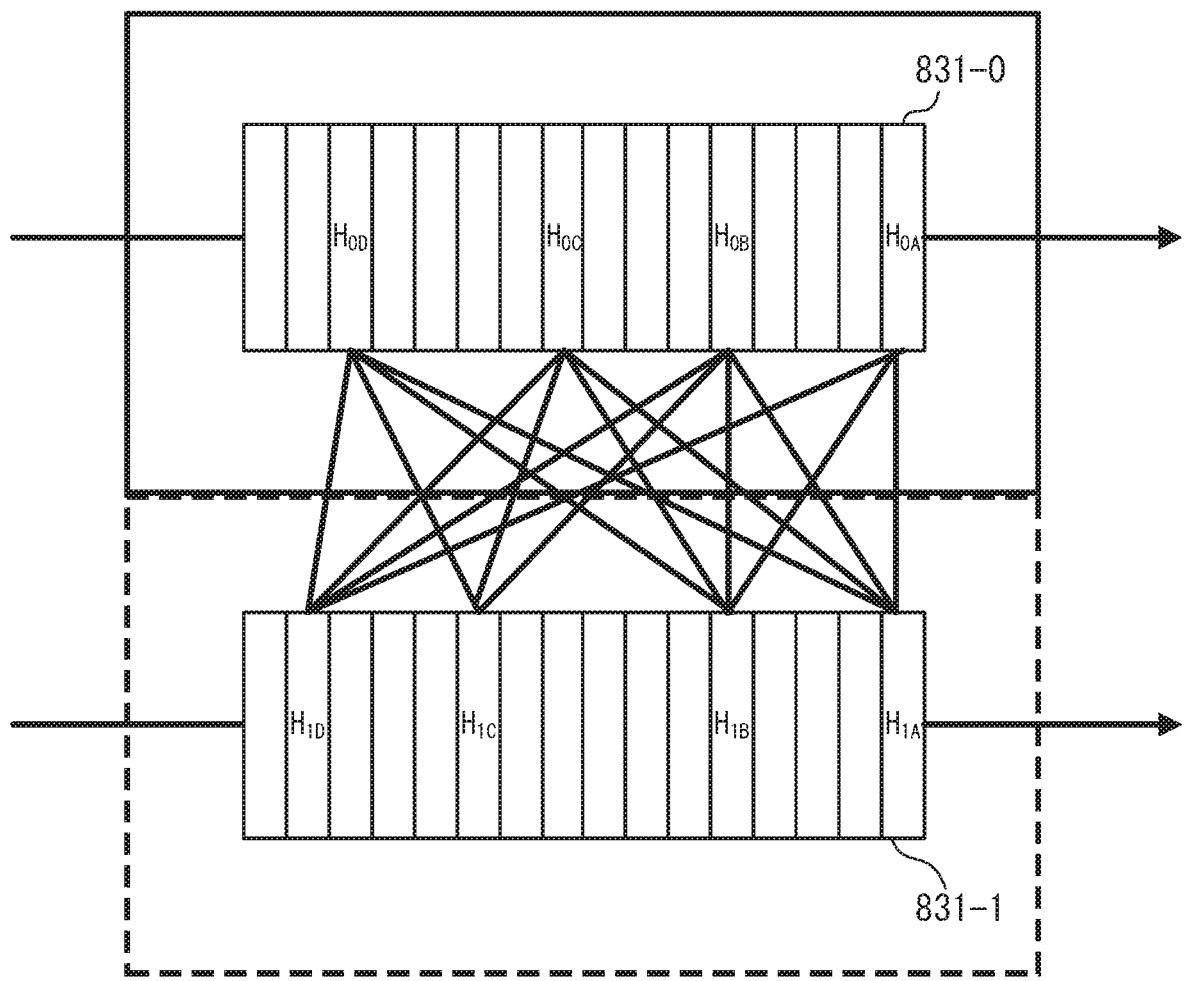
FIG. 10 illustrates buffer circuits of two lanes in accordance with a comparative example.

FIG. 10 illustrates buffer circuits of two lanes in accordance with a comparative example.

Buffer circuit 831-0 stores packets received via lane 0 in order of arrival. Buffer circuit 831-1 stores packets received via lane 1 in order of arrival.

Headers $H_{0A}$ to $H_{0D}$ of packets are detected in buffer circuit 831-0. Headers $H_{1A}$ to $H_{1D}$ of packets are detected in buffer circuit 831-1. In the comparative example, matching between header $H_{0A}$ and each of headers $H_{1A}$ to $H_{1D}$ is performed. Matching between header $H_{0B}$ and each of headers $H_{1A}$ to $H_{1D}$ is performed. Matching between header $H_{0C}$ and each of headers $H_{1A}$ to $H_{1D}$ is performed. Matching between header $H_{0D}$ and each of headers $H_{1A}$ to $H_{1D}$ is performed. When, for example, the matching of headers $H_{0A}$ and $H_{1A}$ succeeds, buffer circuits 831-0 and 831-1 respectively output headers $H_{0A}$ and $H_{1A}$ at the same timing.

Figure 11:
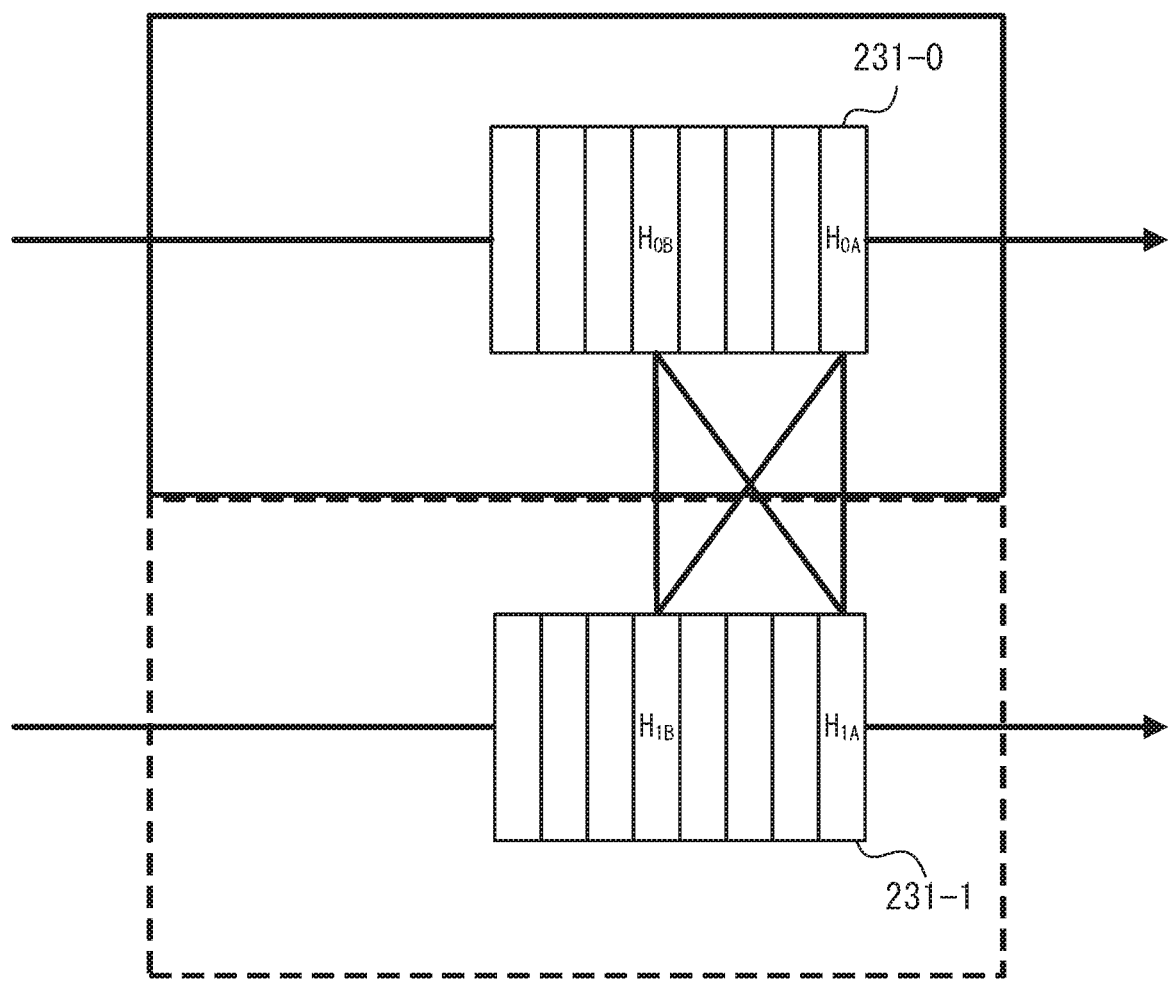
FIG. 11 illustrates buffer circuits of two lanes in accordance with embodiments.

FIG. 11 illustrates buffer circuits of two lanes in accordance with embodiments.

Buffer circuit 231-0 stores packets received via lane 0 in order of arrival. Buffer circuit 231-1 stores packets received via lane 1 in order of arrival.

Headers $H_{0A}$ and $H_{0B}$ of packets are detected in buffer circuit 231-0. Headers $H_{1A}$ and $H_{1B}$ of packets are detected in buffer circuit 231-1. In embodiments, matching between header $H_{0A}$ and each of headers $H_{1A}$ and $H_{1B}$ is performed. Matching between header $H_{0B}$ and each of headers $H_{1A}$ and $H_{1B}$ is performed. When, for example, the matching of headers $H_{0A}$ and $H_{1A}$ succeeds, buffer circuits 231-0 and 231-1 respectively output headers $H_{0A}$ and $H_{1A}$ at the same timing.

In a situation in which a received packet includes an error in the presence of a skew variation, the buffer circuit in embodiments has a smaller capacity for data storage (buffer size) than in the comparative example. This is because the buffer size depends on a packet length and a skew-ensuring value. In a situation in which both packets in the buffer circuits of two lanes for which matching is performed have a likelihood of having been destroyed, in the comparative example, not only buffer stages of the skew-ensuring stage number but also extra buffer stages for correcting a failure of the own lane are provided to conceal the fact that the packets in the own lane have been destroyed. This is because a specified skew-ensuring value is not externally ensured. In embodiments, by contrast, it is ensured that data in the packet portion of a lane used as a main factor in matching include no errors, and hence extra buffer stages do not need to be provided, unlike in in the comparative example.

Embodiments allow a buffer size to be decreased so that the circuit scale can be decreased.

FIG. 12 illustrates the configuration of a chip on a reception side in accordance with a comparative example.

The chip on the reception side in accordance with the comparative example includes lane-specific circuits 811-$i$. The lane-specific circuit 811-$i$ processes data received from a lane $i$.

The lane-specific circuit 811-$i$ includes a buffer circuit 831-$i$ and a match circuit 841-$i$.

The buffer circuit 831-$i$ stores packets received via a lane $i$ in order of arrival.

The match circuit 841-$i$ performs matching of data received from the buffer circuit 831-$i$ and reports a read position and a read timing to the buffer circuit 831-$i$. The buffer circuit 831-$i$ outputs data in accordance with the reported read position and read timing.

Figure 13:
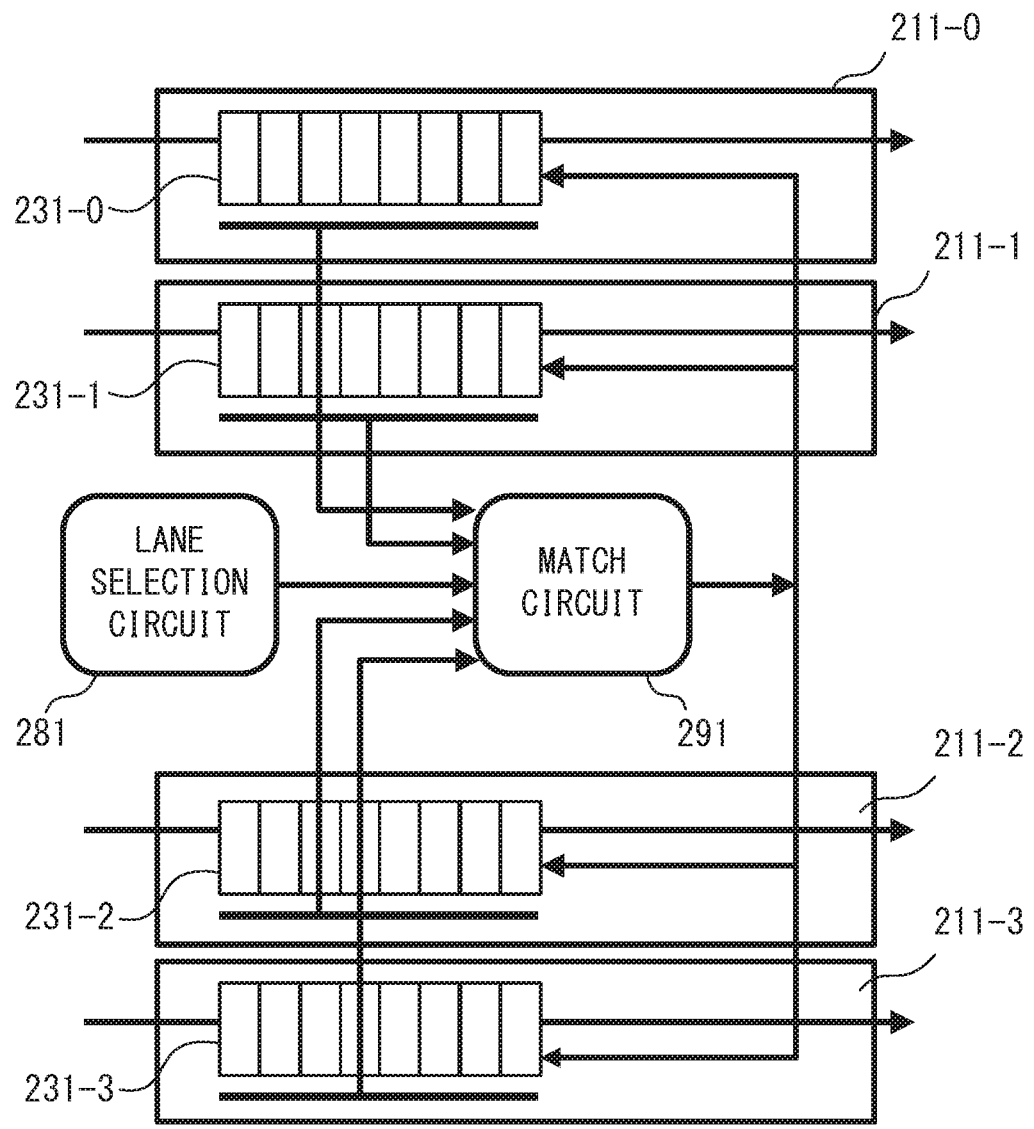
FIG. 13 illustrates the configuration of a chip on a reception side in accordance with embodiments.

FIG. 13 illustrates the configuration of a chip on a reception side in accordance with embodiments.

The chip on the reception side includes lane-specific circuits 211-$i$, the lane selection circuit 281, and the match circuit 291.

The lane-specific circuit 211-$i$ includes a transceiver circuit (not illustrated in FIG. 13) and a buffer circuit 231-$i$.

The processing operations performed by the lance-specific circuit 211-$i$, the lane selection circuit 281, and the match circuit 291 have already been described hereinbefore by referring to FIGS. 3-9, and descriptions thereof are omitted herein.

FIG. 13 is an explanatory diagram for salient features of embodiments in terms of lanes being combined into a plurality of groups. In a structure such as that in the comparative example of FIG. 12, in which lanes are independent of each other, matching is performed for every possible pair of lanes, and then outputs are determined by performing arbitration. In embodiments, a match circuit 291 is not provided for each individual lane-specific circuit 211-$i$, but only one match circuit 291 is provided to decrease the number of times matching is performed, thereby decreasing the circuit scale and the amount of wiring. In addition, the match circuit 291 determines a lane to serve as a main factor for matching and couples the selected lane bus to a bus that serves as a main factor for matching. Selecting a bus to serve as a main factor for matching allows the number of patterns matching in parallel to be decreased and allows the arbitration circuit on a subsequent stage to be removed. In the independence structure, when the buffer circuit of each lane includes X entries and the number of lanes is N, the number of times matching is performed is $_NC_2$ (=N (N−1)/2) in the comparative example, and in embodiments, the number times matching is performed is N−1, i.e., a far smaller number than that in the comparative example.

As depicted in FIGS. 10-13, embodiments provide improvement for each single lane and for the entirety of a lane set. In embodiments, the buffer amount of each individual lane is decreased by, for example, 20% to 50%, and the total amount is decreased by the amount of the decrease in the buffer amount of a single lane multiplied by the number of lanes. In addition, in the comparative example, matching is performed $X^2*(N(N-1)/2)*N$ times for the entirety of a lane set. In embodiments, by contrast, the number of times matching is performed may be $X^2*(N-1)$. Note that the matching is performed with a bus width of B (bits).

In embodiments, the number of match circuits is one so that the circuit scale can be decreased.

FIG. 14 is a configuration diagram of a system in accordance with a comparative example.

A system 601 includes a transmission apparatus 701 and a reception apparatus 801. The transmission apparatus 701 and the reception apparatus 801 are circuits, e.g., large-scale integrations (LSIs).

The transmission apparatus 701 and the reception apparatus 801 are connected via a plurality of lanes 901-$i$.

The transmission apparatus 701 includes transmission circuits 711-$i$.

The transmission apparatus 701 transmits data via a serial communication using a plurality of lanes 901-$i$. When data is transmitted from the transmission apparatus 701 to the reception apparatus 801, the transmission apparatus 701 generates a plurality of packets by dividing the data to be transmitted into as many pieces as the number of the lanes, and the transmission circuits 711-$i$ each transmit each of the plurality of generated packets to the reception apparatus 801 via a corresponding lane 901-$i$.

The reception apparatus 801 reconstructs the original transmitted data by combining the packets received via the individual lanes 901-$i$. The reception apparatus 801 includes lane-specific circuits 811-$i$. The lane-specific circuit 811-$i$ includes a reception circuit 821-$i$, a buffer circuit 831-$i$, and a match circuit 841. The functions of the reception circuit 821-$i$, the buffer circuit 831-$i$, and the match circuit 841 have already been described hereinbefore by referring to FIG. 12, and descriptions thereof are omitted herein.

A high-speed serial transfer is used for a communication between the transmission apparatus 701 and the reception apparatus 801, and packets of individual lanes are transferred independently of each other. Hence, even when the transmission circuits 711-$i$ output packets concurrently to all lanes, the packets are often received at different timings. The differences in timing between lanes are varied with time. Especially in an environment with a skew variation, the skew difference is large. In a structure such as the system 601 of the comparative example, in which lanes are independent of each other, matching is performed using buses across lanes that link the match circuits 841-$i$. According to a matching result based on the bases and arbitration, packets are read from buffer circuits 811-$i$, and ultimate data is obtained.

In the comparative example, a transfer can be performed according to the cut-through scheme in the presence of a skew variation. In the comparative example, however, as many match circuits as the number of lanes are installed. This increases the circuit area, and it would be difficult to actually achieve (implement) such a configuration, in consideration of the circuit implementation.

To decrease the circuit scale, the system in accordance with embodiments is not mounted with a plurality of circuits capable of handling errors that would be fixedly provided for all lanes but includes one circuit for handling errors that can be dynamically allocated. In the dynamic allocating, only one circuit is provided, unlike in the conventional art, in which N circuits are fixedly provided, i.e., the circuit amount is decreased in the embodiments. In the conventional art, circuits for handling multiple failures are incorporated; in embodiments, by contrast, one circuit for correcting errors in lanes is mounted (mutual lane failures are not corrected) to decrease the circuit amount of each individual lane. In this way, the circuit amount is decreased by decreasing the number of circuits and the circuit scale for each individual lane. Under a condition in which appropriate dynamic allocation is performed (dynamic allocation is not directed to faulty lanes, and matching between faulty lanes does not occur), embodiments provide sufficient failure tolerance.

In embodiments, an opposite-shore flow is used to perform appropriate dynamic allocation while avoiding portions in which an error has occurred. An error lane is identified and reported to an opposite shore, and allocation is performed without designating the error lane as a main factor for matching. Accordingly, even though the circuit scale is decreased, the preconditions for providing sufficient failure tolerance are satisfied. In the opposite-shore flow, both an error detection on an opposite shore and an error detection on the own shore are deemed as significant information and used for determinations in a lane selection. In some cases, only one of the error detections is used after all.

Even in a case where there are a plurality of errors, when at least one normal lane is present, the preconditions are satisfied by selecting this lane as a main factor. When all lanes are faulty, such a problem could be solved in theory by using the conventional scheme; however, the problem is difficult to solve after all because almost no communications can be performed as errors often happen in all lanes. In such a case, the parts would have already been replaced under normal circumstances.

Embodiments allow effective power-saving operations to be performed. In accordance with embodiments, lanes can operate independently of each other, and even when the lanes have differences in clock phase therebetween, the lanes can operate. Using a clock for each of the lanes, the operation of the lanes can be started or stopped online (system operations are not stopped). In particular, with regard to the stopping of operations, in the conventional art, a difference between clock phases that produces a huge skew between lanes is not allowed, and hence stopping a lane merely affects the data input/output circuit and does not go as far as to stop a clock. Embodiments allow a clock for a lane to be stopped so that power consumption can be decreased. Super computers and large-scale data systems rarely use the entirety of a network bandwidth thereof, and hence the function of dynamically online stopping or restarting each lane as in embodiments will be effective.

In the system in accordance with embodiments, when a skew changes, i.e., when a skew variation is present, a cut-through transfer can be performed.

In the system in accordance with embodiments, buffer sizes can be decreased so that the circuit scale can be decreased.

The system in accordance with embodiments include only one match circuit so that the circuit scale can be decreased.

In embodiments, it takes about 80 to 90 ns to perform a transfer between chips (1 hop) (it takes about 200 to 350 ns to perform such a transfer in the conventional art), and continuous stable operations such as gradual performance degeneration can be achieved without an occurrence of hanging even in the case of a failure occurrence or degeneration.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission and reception system comprising:
a data transmission apparatus; and
a data reception apparatus connected to the data transmission apparatus via a plurality of transmission paths, wherein
the data reception apparatus includes
a plurality of error detection circuits each provided for each of the plurality of transmission paths and configured to each detect an error in received data that has been received from the data transmission apparatus,
a plurality of storage circuits each provided for each of the plurality of transmission paths and configured to each store the received data and read the received data at a reported read position at a reported read timing, a selection circuit configured to select one of the plurality of transmission paths according to a plurality of error detection results each provided by each of the plurality of error detection circuits, and a report circuit configured to compare received data stored by a storage circuit corresponding to a transmission path selected by the selection circuit with received data stored by each of other storage circuits and, according to a comparison result, report the read timing and the read position to each of the plurality of storage circuits.

2. The transmission and reception system of claim 1, wherein the selection circuit selects a transmission path having a smallest error detection count from among the plurality of transmission paths.

3. The transmission and reception system of claim 1, wherein the reception apparatus transmits, for each of the plurality of transmission paths, an error detection result to the data transmission apparatus.

4. The transmission and reception system of claim 1, wherein the report circuit performs a comparison by using a packet header of the received data stored by each of the plurality of storage circuits.

5. A data reception apparatus connected to a data transmission apparatus via a plurality of transmission paths, the data reception apparatus comprising:

a plurality of error detection circuits each provided for each of the plurality of transmission paths and configured to each detect an error in received data that has been received from the data transmission apparatus;

a plurality of storage circuits each provided for each of the plurality of transmission paths and configured to each store the received data and read the received data at a reported read position at a reported read timing;

a selection circuit configured to select one of the plurality of transmission paths according to a plurality of error detection results each provided by each of the plurality of error detection circuits; and a report circuit configured to compare received data stored by a storage circuit corresponding to a transmission path selected by the selection circuit with received data stored by each of other storage circuits and, according to a comparison result, report the read timing and the read position to each of the plurality of storage circuits.

6. The data reception apparatus of claim 5, wherein the selection circuit selects a transmission path having a smallest error detection count from among the plurality of transmission paths.

7. The data reception apparatus of claim 5, wherein the data reception apparatus transmits, for each of the plurality of transmission paths, an error detection result to the data transmission apparatus.

8. The data reception apparatus of claim 5, wherein the report circuit performs a comparison by using a packet header of the received data stored by each of the plurality of storage circuits.

9. A data reception method for a data reception apparatus connected to a data transmission apparatus via a plurality of transmission paths, the data reception method comprising:

detecting, by each of a plurality of error detection circuits of the data reception apparatus, an error in received data that has been received from the data transmission apparatus, each of the plurality of error detection circuits being provided for each of the plurality of transmission paths;

selecting, by a selection circuit of the data reception apparatus, one of the plurality of transmission paths according to a plurality of error detection results each provided by each of the plurality of error detection circuits;

comparing, by a report circuit of the data reception apparatus, received data stored by a storage circuit corresponding to a transmission path selected by the selection circuit with received data stored by each of other storage circuits;

reporting, by the report circuit, a read timing and a read position to each of the plurality of storage circuits according to a comparison result; and reading, by a plurality of storage circuits of the data reception apparatus, received data at the reported read position at the reported read timing, the plurality of storage circuits each being provided for each of the plurality of transmission paths and each storing the received data.

10. The data reception method of claim 9, wherein the selecting one of the plurality of transmission paths selects a transmission path having a smallest error detection count from among the plurality of transmission paths.

11. The data reception method of claim 9, further comprising:

transmitting, for each of the plurality of transmission paths, an error detection result to the data transmission apparatus.

12. The data reception method of claim 9, wherein the comparing the received data performs a comparison by using a packet header of the received data stored by each of the plurality of storage circuits.

* * * * *